(12) United States Patent
Uhm et al.

(10) Patent No.: US 12,650,596 B2
(45) Date of Patent: Jun. 9, 2026

(54) ELECTRONIC DEVICE AND METHOD FOR ADJUSTING VOLUME USING ACOUSTIC SIGNAL OUTPUT FROM EXTERNAL OBJECT

(71) Applicant: SAMSUNG ELECTRONICS CO., LTD., Suwon-si (KR)

(72) Inventors: Junwhon Uhm, Suwon-si (KR); Seungnyun Kim, Suwon-si (KR); Minjung Park, Suwon-si (KR); Jongmin Yoon, Suwon-si (KR); Jinchoul Lee, Suwon-si (KR); Nammin Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 18/313,706

(22) Filed: May 8, 2023

(65) Prior Publication Data

US 2024/0036323 A1 Feb. 1, 2024

Related U.S. Application Data

(63) Continuation of application No. PCT/KR2023/004876, filed on Apr. 11, 2023.

(30) Foreign Application Priority Data

Jul. 26, 2022 (KR) ........................ 10-2022-0092524
Sep. 16, 2022 (KR) ........................ 10-2022-0117175

(51) Int. Cl.
*G02B 27/01* (2006.01)
*G06F 1/16* (2006.01)
(Continued)

(52) U.S. Cl.
CPC ........... *G02B 27/0172* (2013.01); *G06F 1/16* (2013.01); *G06F 1/163* (2013.01); *G06F 3/00* (2013.01);
(Continued)

(58) Field of Classification Search
None
See application file for complete search history.

(56) References Cited

U.S. PATENT DOCUMENTS 8,620,134 B2 12/2013 Koyanagi et al.
8,970,725 B2 3/2015 Mekenkamp et al.
(Continued)

FOREIGN PATENT DOCUMENTS

JP 2007028261 2/2007
JP 4926916 5/2012
(Continued)

OTHER PUBLICATIONS

Search Report and Written Opinion dated Jul. 20, 2023 issued in International Patent Application No. PCT/KR2023/004876.
(Continued)

*Primary Examiner* — Jwalant Amin
(74) *Attorney, Agent, or Firm* — Nixon & Vanderhye, P.C.

(57) ABSTRACT

According to an embodiment, a processor of a wearable device is configured to control a display to display a visual object in association with an external object viewable through a display. The processor is configured to identify whether an acoustic signal is output from an external object, in response to receiving the acoustic signal having a first volume while displaying the visual object, through a microphone of the wearable device, based at least on an image obtained by a camera. Based on identifying that the acoustic signal is output from the external object, the processor is
(Continued)

configured to obtain a second volume corresponding to the visual object, by adjusting the first volume based on a position relationship between the external object and the visual object. The processor is configured to output an audio signal corresponding to the visual object through a speaker of the wearable device based on the obtained second volume.

20 Claims, 18 Drawing Sheets

(51) Int. Cl.

| | |
|---|---|
| *G06F 3/00* | (2006.01) |
| *G06F 3/01* | (2006.01) |
| *G06F 3/04847* | (2022.01) |
| *G06F 3/16* | (2006.01) |
| *G06T 7/70* | (2017.01) |
| *G06T 19/00* | (2011.01) |
| *H04R 3/12* | (2006.01) |

(52) U.S. Cl.

CPC .............. *G06F 3/011* (2013.01); *G06F 3/013* (2013.01); *G06F 3/017* (2013.01); *G06F 3/04847* (2013.01); *G06F 3/16* (2013.01); *G06F 3/165* (2013.01); *G06T 7/70* (2017.01); *G06T 19/006* (2013.01); *H04R 3/12* (2013.01); *G02B 2027/0138* (2013.01); *G02B 2027/014* (2013.01); *G06F 2203/0381* (2013.01)

(56) References Cited

U.S. PATENT DOCUMENTS

| | | | |
|---|---|---|---|
| 9,734,402 B2 | 8/2017 | Jang et al. | |
| 10,320,437 B2 * | 6/2019 | Fei ........................ | H04W 4/026 |
| 10,585,472 B2 | 3/2020 | Tokubo et al. | |
| 11,189,102 B2 | 11/2021 | Kwon et al. | |
| 11,330,387 B2 | 5/2022 | Jang et al. | |
| 11,533,579 B2 * | 12/2022 | Sakuma .................. | H04S 7/304 |
| 11,670,026 B2 | 6/2023 | Canberk et al. | |

| | | | |
|---|---|---|---|
| 2010/0265164 A1 * | 10/2010 | Okuno .................... | H04S 7/304 |
| | | | 345/8 |
| 2012/0206452 A1 * | 8/2012 | Geisner ................... | G06F 3/013 |
| | | | 345/419 |
| 2014/0006026 A1 * | 1/2014 | Lamb ...................... | G10L 17/00 |
| | | | 704/E17.001 |
| 2016/0313973 A1 * | 10/2016 | Yajima .................... | G06F 3/165 |
| 2016/0379660 A1 | 12/2016 | Wright et al. | |
| 2017/0243520 A1 * | 8/2017 | Teshima .................. | G10L 15/26 |
| 2017/0277257 A1 * | 9/2017 | Ota ....................... | G02B 27/017 |
| 2018/0046874 A1 * | 2/2018 | Guo ....................... | G06V 10/507 |
| 2019/0289418 A1 | 9/2019 | Jang | |
| 2019/0387102 A1 * | 12/2019 | Norris .................... | H04S 7/302 |
| 2019/0394607 A1 * | 12/2019 | Laaksonen .............. | H04R 5/04 |
| 2020/0217917 A1 * | 7/2020 | Ryu ....................... | G01S 3/801 |
| 2020/0233635 A1 * | 7/2020 | Torgerson ........ | H04N 21/42202 |
| 2020/0387341 A1 * | 12/2020 | Robinson .............. | H04R 25/50 |
| 2022/0021972 A1 * | 1/2022 | Brimijoin, II ........ | G06T 19/006 |
| 2022/0021998 A1 * | 1/2022 | Bae ......................... | H04S 7/304 |
| 2022/0312142 A1 * | 9/2022 | Leppanen .............. | G06F 3/165 |
| 2024/0430636 A1 * | 12/2024 | Tsuruga .................. | H04R 3/00 |
| 2025/0224916 A1 * | 7/2025 | Lee ........................... | G06F 3/00 |

FOREIGN PATENT DOCUMENTS

| | | |
|---|---|---|
| KR | 10-2005-0075031 | 7/2005 |
| KR | 10-2015-0129546 | 11/2015 |
| KR | 20170069790 A | 6/2017 |
| KR | 10-1983256 | 5/2019 |
| KR | 10-2019-0076360 | 7/2019 |
| KR | 20190109019 A | 9/2019 |
| KR | 20200038162 A | 4/2020 |
| KR | 10-2020-0143293 | 12/2020 |
| KR | 10-2209511 | 1/2021 |
| KR | 10-2021-0034638 | 3/2021 |
| KR | 10-2022-0043088 | 4/2022 |
| KR | 10-2398850 | 5/2022 |
| KR | 102398850 B1 | 5/2022 |
| WO | 2020/139801 | 7/2020 |
| WO | 2022044342 A1 | 3/2022 |

OTHER PUBLICATIONS

Extended Search Report dated Jul. 7, 2025 in European Application No. 23846737.7.

* cited by examiner

100

1

ELECTRONIC DEVICE AND METHOD FOR ADJUSTING VOLUME USING ACOUSTIC SIGNAL OUTPUT FROM EXTERNAL OBJECT

CROSS-REFERENCE TO RELATED APPLICATIONS

This application is a continuation of International Application No. PCT/KR2023/004876 designating the United States, filed on Apr. 11, 2023, in the Korean Intellectual Property Receiving Office and claiming priority to Korean Patent Application No. 10-2022-0092524, filed on Jul. 26, 2022, in the Korean Intellectual Property Office, and to Korean Patent Application No. 10-2022-0117175, filed on Sep. 16, 2022, in the Korean Intellectual Property Office, the disclosures of all of which are incorporated by reference herein in their entireties.

BACKGROUND

Field

The disclosure relates to an electronic device and a method for adjusting a volume using an acoustic signal output from an external object.

Description of Related Art

In order to provide enhanced user experience, an electronic device providing an augmented reality (AR) service displaying information generated by a computer in association with an external object in real world is being developed. The electronic device may be a wearable device worn by a user. For example, the electronic device may be AR glasses and/or a head-mounted device (HMD).

SUMMARY

According to an example embodiment, a wearable device may comprise: a speaker, a microphone, a display, a camera, and a processor. The display may be configured to allow at least portion of light incident on a first surface to penetrate through the display to a second surface opposite to the first surface. The camera may be configured to capture an image. The processor may be configured to control the display to display a visual object in association with an external object viewable through the display. The processor may be configured to receive an acoustic signal through the microphone while displaying the visual object. The processor may be configured to identify, at least based on the image obtained by the camera in response to receiving the acoustic signal having a first volume, whether the acoustic signal is output from the external object. The processor may be configured to obtain, based on identifying that the acoustic signal is output from the external object, a second volume corresponding to the visual object by adjusting the first volume based on a position relationship between the external object, and the visual object. The processor may be configured to output an audio signal corresponding to the visual object through the speaker based on the obtained second volume.

According to an example embodiment, a method of operating a wearable device may comprise displaying a visual object in association with an external object viewable through a display of the wearable device. The method may comprise receiving an acoustic signal through a microphone of the wearable device while displaying the visual object. The method may comprise identifying, in response to receiving the acoustic signal having a first volume, whether the acoustic signal is output from the external object at least based on an image obtained by a camera of the wearable device. The method may comprise obtaining, based on identifying that the acoustic signal is output from the external object, a second volume corresponding to the visual object by adjusting the first volume based on position relationship between the external object and the visual object. The method may comprise outputting an audio signal corresponding to the visual object through a speaker of the wearable device based on the obtained second volume.

According to an example embodiment, a wearable device may comprise: a communication circuit, a speaker, a microphone, a display, a camera, and a processor. The display may be configured to allow at least portion of light incident on a first surface to penetrate through the display to a second surface opposite to the first surface. The camera may be configured to capture an image. The processor may be configured to control the display to display a visual object in association with an external object viewable through the display. The processor may be configured to receive, while displaying the visual object, an acoustic signal having a first volume through the microphone. The processor may be configured to identify, in response to receiving the acoustic signal, whether the acoustic signal is output from the external object for reproducing an audio signal. The processor may be configured to obtain, based on identifying that the acoustic signal is output from the external object, a second volume corresponding to the visual object by adjusting the first volume based on a position relationship between the external object and the visual object. The processor may be configured to output, based on the obtained second volume, at least portion of the audio signal received from the external object through the communication circuit.

According to an example embodiment, a method of operating a wearable device may comprise displaying a visual object in association with an external object viewable through a display of the wearable device. The method may comprise receiving an acoustic signal having a first volume through a microphone of the wearable device while displaying the visual object. The method may comprise identifying, in response to the receiving of the acoustic signal, whether the acoustic signal is output from the external object for reproducing an audio signal. The method may comprise obtaining, based on identifying that the acoustic signal is output from the external object, a second volume corresponding to the visual object by adjusting the first volume based on a position relationship between the external object and the visual object. The method may comprise outputting, based on the obtained second volume, at least portion of the audio signal received from the external object through a communication circuitry of the wearable device, through a speaker of the wearable device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
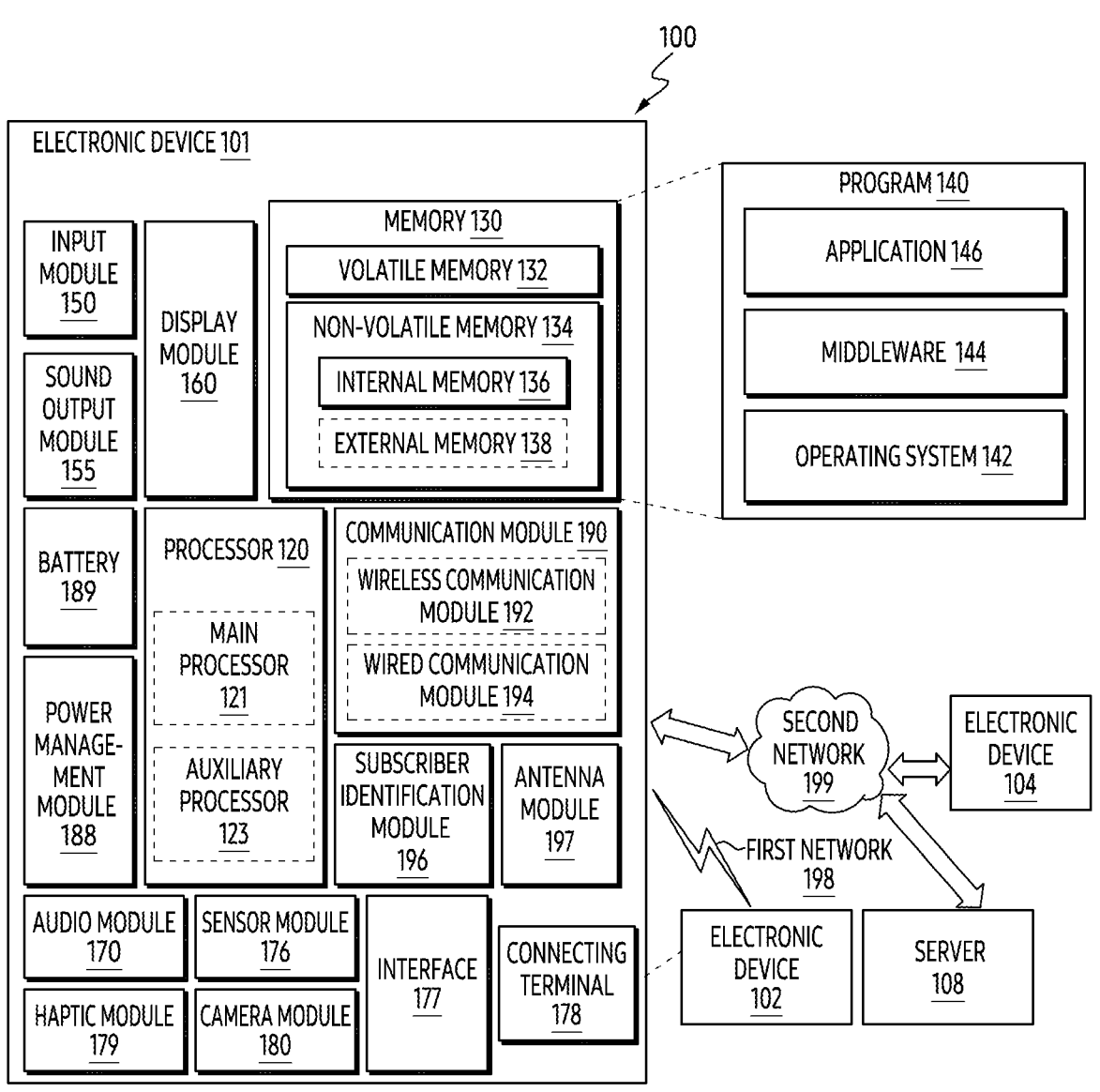
FIG. 1 is a block diagram illustrating an example electronic device in a network environment according to various embodiments.

Hereinafter, various example embodiments of the present disclosure will be described in greater detail with reference to the accompanying drawings.

The various example embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
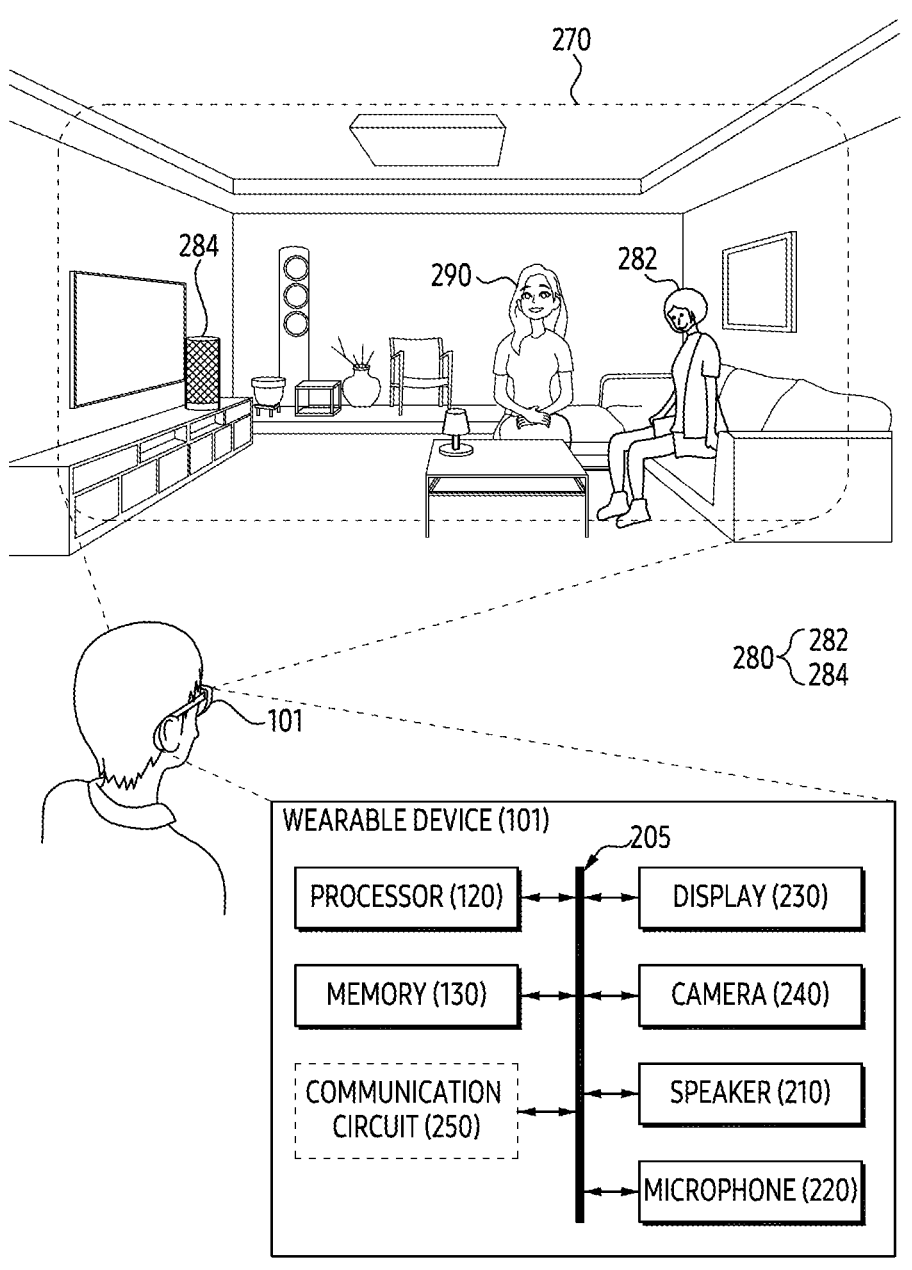
FIG. 2 is a diagram an example of a user interface (UI) provided by a wearable device according to an embodiment.

FIG. 2 is a diagram illustrating an example of a user interface (UI) provided by a wearable device 101 according to an embodiment. According to an embodiment, the wearable device 101 may have a form of glasses wearable on a user's body part (e.g., head). The wearable device 101 may include a head-mounted display (HMD). For example, a housing of the wearable device 101 may include a flexible material such as rubber and/or silicon having a shape that adheres closely to a part of the user's head (e.g., a part of a face that covers both eyes). For example, the housing of the wearable device 101 may include one or more straps, which is able to be twined around the user's head and/or one or more temples, which is attachable to ears of the head. According to an embodiment, a form of the wearable device 101 may be described with reference to FIGS. 3A, 3B, 4A and/or 4B.

FIG. 2 includes a block diagram illustrating an example configuration of the wearable device 101 according to an embodiment. The wearable device 101 of FIG. 2 may be connected to the electronic device 101 of FIG. 1 by wire or wirelessly. Referring to FIG. 2, according to an embodiment, the wearable device 101 may include at least one of a processor (e.g., including processing circuitry) 120, a memory 130, a speaker 210, a microphone 220, a display 230, a camera 240, and/or a communication circuit 250. The processor 120, the memory 130, the speaker 210, the microphone 220, the display 230, the camera 240, and the communication circuit 250 may be electronically and/or operably coupled with each other by an electronical component such as a communication bus 205. Operably coupled hardware may refer, for example, to a direct connection or indirect connection between hardware being established wired or wirelessly in order to ensure that a specific hardware among hardware is controlled by another hardware and/or the other hardware is controlled by the specific hardware. A type and/or number of hardware included in the wearable device 101 is not limited to an example of FIG. 2.

According to an embodiment, the processor 120 of the wearable device 101 may include a circuit for processing data based on one or more instructions. For example, the hardware component for processing data may include an arithmetic and logic unit (ALU), a floating point unit (FPU), a field programmable gate array (FPGA), and/or a central processing unit (CPU). The number of the processors 120 may be one or more. For example, the processor 120 may have a structure of a multi-core processor such as a dual core, a quad core, or a hexa core. The processor 120 of FIG. 2 may include the processor 120 of FIG. 1.

According to an embodiment, the memory 130 of the wearable device 101 may include a hardware for storing data and/or instructions input and/or output to and from the processor 120. For example, the memory 130 may include a volatile memory such as random-access memory (RAM) and/or a non-volatile memory such as read-only memory (ROM). For example, the volatile memory may include at least one of dynamic RAM (DRAM), static RAM (SRAM), Cache RAM, or pseudo SRAM (PSRAM). For example, the nonvolatile memory may include at least one of programmable ROM (PROM), erasable PROM (EPROM), electrically erasable PROM (EEPROM), flash memory, hard disk, compact disk, or embedded multi-media card (eMMC). The memory 130 of FIG. 2 may include the memory 130 of FIG. 1.

One or more instructions indicating a calculation and/or an operation to be performed on data by the processor 120 may be stored in the memory 130. A set of one or more instructions may be referred to as firmware, operating system, process, routine, sub-routine, and/or application. For example, when a set of a plurality of instructions deployed in the form of operating system, firmware, driver, and/or application is executed, the wearable device 101, and/or the processor 120 may perform at least one of the operations of FIGS. 9 to 12. Hereinafter, the fact that the application is installed in the wearable device 101 may indicate that one or more instructions provided in the form of the application are stored in the memory 130 of the wearable device 101, and may refer, for example, to the one or more applications being stored in an executable format (e.g., a file having an extension designated by the operating system of the wearable device 101) by the processor 120 of the wearable device 101.

According to an embodiment, the speaker 210 of the wearable device 101 may output an audio signal. The number of the speaker 210 included in the wearable device 101 may be one or more. The speaker 210 may be controlled by the processor 120 of the wearable device 101. In a state controlled by the processor 120, the speaker 210 may output an audio signal stored in the wearable device 101 or transmitted to the wearable device 101. For example, the processor 120 may identify compressed data based on an audio codec such as MPEG-1 Audio Layer-3 (mp3) from an audio signal. The processor 120 may generate an electrical signal for outputting sound by the speaker 210 from the data.

According to an embodiment, the microphone 220 of the wearable device 101 may output an electrical signal indicating vibration of the atmosphere. The number of microphone 220 included in the wearable device 101 may be one or more. The electrical signal output from the microphone 220 may be transmitted to the processor 120. The processor 120 may obtain an audio signal for reconfiguring the vibration from the electrical signal using the speaker 210.

According to an embodiment, the display 230 of the wearable device 101 may output visualized information (e.g., at least one of screens of FIGS. 2, 5A, 6A to 6B, and/or 8) to a user. The number of display 230 included in the wearable device 101 may be one or more. For example, the display 230 may be controlled by the processor 120 and/or a graphic processing unit (GPU) to output visualized information to the user. The display 230 may include a flat panel display (FPD) and/or electronic paper. The FPD may include a liquid crystal display (LCD), a plasma display panel (PDP), a digital mirror device (DMD), one or more light emitting diode (LED), and/or micro LED. The LED may include an organic LED (OLED). In an embodiment in which the display 230 includes an LCD, the display 230 may further include a light source (e.g., a backlight) for emitting light toward the LCD. The light source may be omitted in an embodiment in which the display 230 includes OLED.

In an embodiment, at least a portion of the display 230 may allow light to penetrate. The wearable device 101 may provide a user with a user experience related to augmented reality by providing a combination of light output through the display 230 and light penetrating the display 230. An example of a structure of the wearable device 101 for providing a user experience related to augmented reality will be described in greater detail below with reference to FIGS. 3A and 3B. In an embodiment, the wearable device 101 may have a structure in which the display 230 overlaps the entire field-of-view (FoV) of the user while being worn on a users body part, such as the head. The display 230 may block the surrounding light of the wearable device 101 from being transmitted to the users eyes within the state. For example, the wearable device 101 may provide a user experience related to virtual reality to a user using the display 230. An example of a structure of the wearable device 101 for providing the user experience related to the virtual reality will be described in greater detail below with reference to FIGS. 4A and 4B.

According to an embodiment, the camera 240 of the wearable device 101 may include one or more optical sensors (e.g. charged coupled device (CCD) sensor, complementary metal oxide semiconductor (CMOS) sensor) that generate an electrical signal indicating the color and/or brightness of light. A plurality of optical sensors included in the camera 240 may be disposed in the form of a 2 dimensional array. The camera 240 may generate an image including a plurality of pixels arranged in two dimensions and corresponding to light reaching optical sensors of a two-dimensional array, by substantially simultaneously obtaining an electrical signal of each of the plurality of optical sensors. For example, the photo data captured using the camera 240 may indicate one image obtained from the camera 240. For example, the video data captured using the camera 240 may refer, for example, to a sequence of a plurality of images obtained according to a specified frame rate from the camera 240. The wearable device 101 according to an embodiment may further include a flashlight disposed in a direction in which the camera 240 receives light and for outputting light in the direction. The number of the camera 240 included in the wearable device 101 may be one or more.

In an embodiment, the FoV of the camera 240 may include an area formed based on a view angle in which the lens of the camera 240 can receive light, and may correspond to an area corresponding to an image generated by the camera 240. Hereinafter, a subject and/or an external object refer to an object included in the FOV of the camera 240 and distinguished from the wearable device 101. In an embodiment, the FoV of the camera 240 may at least partially match the users viewable environment through the display 230, as shown in the FoV 270 of FIG. 2.

According to an embodiment, the communication circuit 250 of the wearable device 101 may include hardware to support transmission and/or reception of an electrical signal between the wearable device 101 and the external electronic device (e.g., the external object 284). Referring to FIG. 2, an external object 284 that is a speaker is illustrated as an example of an external electronic device. For example, the communication circuit 250 may include at least one of a MODEM, an antenna, and an optic/electronic (O/E) converter. The communication circuit 250 may support transmission and/or reception of an electrical signal based on various types of protocols such as Ethernet, local area network (LAN), wide area network (WAN), wireless fidelity (WiFi), Bluetooth, Bluetooth low energy (BLE), ZigBee, long term evolution (LTE), and 5G new radio (NR). According to an embodiment, an operation performed by the wearable device 101 based on the communication between the external electronic device and the wearable device 101 will be described in greater detail below with reference to FIG. 8.

Although not illustrated, the wearable device 101 may include other output means for outputting information in a form other than a visual form or an audible form. For example, the wearable device 101 may include a motor for providing a haptic feedback based on vibration. Meanwhile, although illustrated based on different blocks, the embodiment is not limited thereto, and a part (e.g., at least a part of the processor 120, the memory 130, and the communication circuit 250) of the hardware components illustrated in FIG. 2 may be included in a single integrated circuit such as a system on a chip (SoC).

As described above, according to an embodiment, the wearable device 101 may include one or more hardware for providing a user experience based on augmented reality (AR) (or mixed reality (MR)) and/or virtual reality (VR). Referring to FIG. 2, an example of a field of view (FoV) 270 viewable to a user through the display 230 of the wearable device 101 is illustrated. In an embodiment of the wearable device 101 including the display 230 configured to penetrate light incident on a first surface through a second surface opposite to the first surface, the FoV 270 may be formed by the light transmitted through the display 230 to both eyes of the user. The wearable device 101 may provide the user experience based on augmented reality, by adding a virtual object overlapping on the FoV 270 using the display 230, together with a tangible object within the FoV 270.

Referring to FIG. 2, according to an embodiment, the wearable device 101 may allow a user wearing the wearable device 101 to recognize an external object 280 included in the FoV 270 shown through the display 230. Referring to FIG. 2, the external objects 282 and 284 are illustrated as an example of the external object 280 included in the FoV 270. The external objects 280 such as external objects 282 and 284 may indicate an object recognized by the wearable device 101.

According to an embodiment, the wearable device 101 may identify the FoV 270 and/or the external object 280 adjacent to the wearable device 101 using the camera 240. The external object 280 may be referred to as a subject and/or a tangible object. For example, the camera 240 may obtain or capture an image disposed based on the direction of the first surface of the display 230 and including light incident on the first surface. For example, the optical axis of the camera included in the wearable device 101 may match the direction of the first surface.

In an embodiment, the screen displayed in FoV 270 by the wearable device 101 using display 230 may include augmented or annotated information based on the environment shown to the user. For example, the wearable device 101 may display one or more visual objects (e.g., a visual object 290) by overlapping within FoV 270 using display 230. The visual object 290 may be referred to as a virtual (or imaginary) object. The visual object 290 may be displayed in display 230, based on an application executed by the processor 120 of wearable device 101, and/or an input received from a user wearing the wearable device 101. The visual object 290 may be displayed by the wearable device 101 to support an interaction between the wearable device 101 and a user wearing the wearable device 101.

According to an embodiment, the wearable device 101 may support an interaction between an external electronic device (e.g., the external object 284 that is a speaker) different from the wearable device 101 and a user, using a visual object (e.g., the visual object 290) displayed in the FoV 270 using the display 230. For example, the visual object 290 may represent an external electronic device connected to the wearable device 101 through a network, and/or a user of the external electronic device. For example, a connection between the wearable device 101 and the external electronic device may be established based on a network service such as video conference. Referring to FIG. 2, in order to represent the external electronic device connected through the network service, and/or the user of the external electronic device, the wearable device 101 may display the visual object 290 such as an avatar representing the external electronic device and/or the user of the external electronic device in the display 230. For example, the visual object 290 may be controlled by a user's input of the external electronic device, which is indicated by a signal received from the external electronic device. For example, in response to receiving a signal indicating the user's gesture of the external electronic device, the wearable device 101 may change the display of the visual object 290.

According to an embodiment, the wearable device 101 may add information within a sound heard by the user using the speaker 210, similar to adding information into the FoV 270 using the display 230. The speaker 210 may be disposed adjacent to at least one of the user's two ears. In an embodiment, the speaker 210 may have a shape for maintaining the open of the external auditory meatus of the user. Based on the open of the external auditory meatus by the speaker 210, sound generated from the external object 280 may be transmitted to the user. For example, when the wearable device 101 outputs an audio signal using the speaker 210, the user may hear all of the audio signal and the sound generated from the external object 280. The embodiment is not limited thereto, and the speaker 210 may have a form (e.g., a form covering the user's ear, such as a headset) for enhancing sound insulation.

According to an embodiment, the wearable device 101 may output an audio signal using the speaker 210 to provide a combination of the sound output from the external object 280 and the audio signal to the user's ear. In order to balance the sound and the audio signal, the wearable device 101 may adjust the volume of the audio signal output from the speaker 210 based on the volume of the sound. The volume may include the amplitude, average intensity, maximum intensity, and/or minimum intensity of the sound and/or audio signal. For example, the wearable device 101 may adjust the volume of the audio signal based on the volume of sound output from the external object 280. The wearable device 101 may obtain the sound output from the external object 280 using the microphone 220. The wearable device 101 may adjust the second volume of the audio signal transmitted to the user through the speaker 210 based on the first volume of the sound.

According to an embodiment, the wearable device 101 may adjust the volume of the audio signal output through the speaker 210 based on the external object 280 adjacent to the wearable device 101 and the visual object 290 displayed by the display 270. In an embodiment in which the wearable device 101 represents an external electronic device connected to the wearable device 101 and/or a user of the external electronic device based on the visual object 290, the wearable device 101 may output the audio signal received from the external electronic device at least based on the volume of sound output from the external object 280.

In an embodiment, the wearable device 101 may identify a source of sound received through the microphone 220 based on an image obtained from the camera 240, in order to adjust the volume of the audio signal using the sound received through the microphone 220. For example, the wearable device 101 may identify whether the sound received through the microphone 220 is outputted from the external object 280. In case the sound is output from the external object 280, the wearable device 101 may adjust the volume of the audio signal based on the volume of the sound. For example, the wearable device 101 may adjust the volume of the audio signal by comparing the position of the external object 280 and the position of the visual object 290 shown through the FoV 270. According to an embodiment, an operation in which the wearable device 101 compares the position of the external object 280 and the position of the visual object 290 will be described in greater detail below with reference to FIGS. 5A and 5B and/or FIGS. 7A, 7B and 7C. According to an embodiment, in a state in which the wearable device 101 adjusts the volume of the audio signal to be output through the speaker 210 based on the sound received through the microphone 220, an example of a UI displayed through the display 230 will be described in greater detail below with reference to FIGS. 6A, 6B and/or 8.

As described above, according to an embodiment, in a state in which the user watches all of the real external object 280 and the virtual visual object 290 through the display 230 of the wearable device 101, the wearable device 101 may optimize the volume of the audio signal output through the speaker 210 based on the volume of the sound output from the external object 280. Since the wearable device 101 optimizes the volume of the audio signal, the user may be prevented/inhibited from redundantly adjusting the volume of the speaker 210. Since the wearable device 101 optimizes the volume of the audio signal, the user may focus on the augmented reality provided by the wearable device 101 without adjusting the volume of the speaker 210. For example, the wearable device 101 may provide immersive augmented reality and/or virtual reality to the user.

Hereinafter, referring to FIGS. 3A and 3B, and/or FIGS. 4A and 4B, according to an embodiment, an example of a form factor of the wearable device 101 will be described.

Figure 3A:
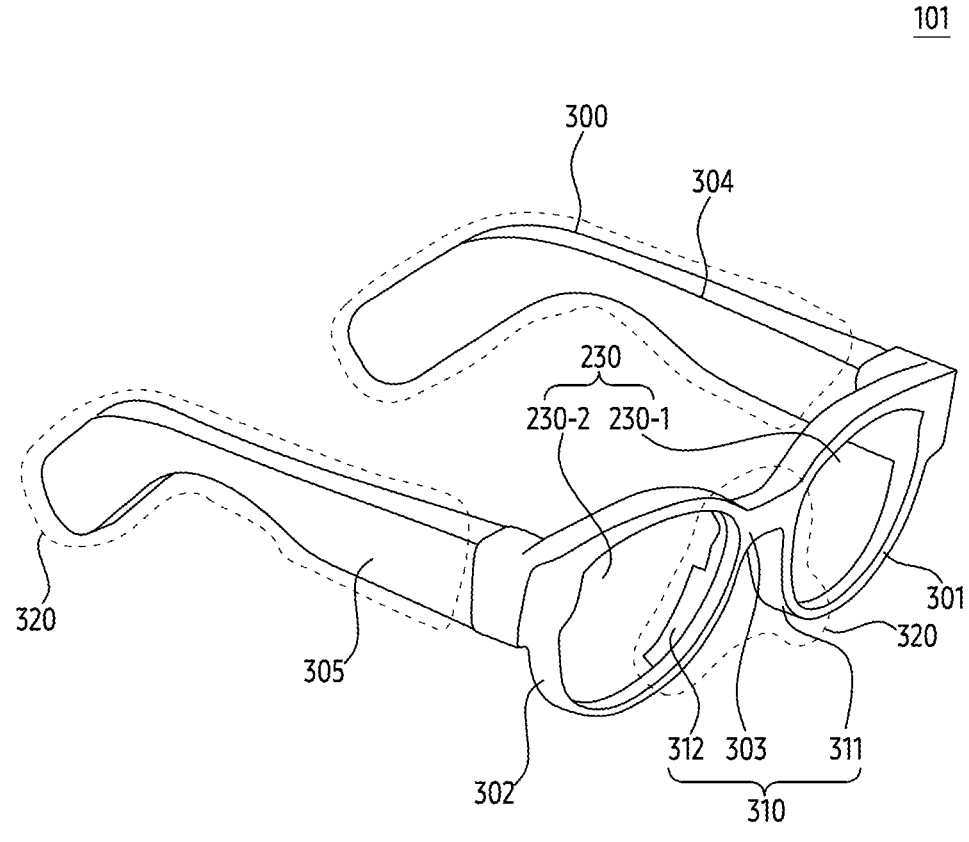
FIG. 3A is a perspective view illustrating an example of a wearable device according to an embodiment.

FIG. 3A is a perspective view illustrating an example of a wearable device 101, according to an embodiment. FIG. 3B is a perspective view illustrating an example of one or more hardware disposed in a wearable device 101, according to an embodiment. The wearable device 101 of FIGS. 3A and 3B may be an example of the wearable device 101 of FIGS. 1 and 2. Referring to FIG. 3A, according to an embodiment, the wearable device 101 may include at least one display 230 and a frame 300 supporting the at least one display 230. The at least one display 230 may be an example of the display 230 of FIG. 2.

According to an embodiment, the wearable device 101 may be worn on a part of the user's body. The wearable device 101 may provide augmented reality (AR), virtual reality (VR), or mixed reality (MR) mixing augmented reality and virtual reality to a user wearing the wearable device 101. For example, the wearable device 101 may display a virtual reality image provided by at least one optical device 382 and 384 of FIG. 3B on at least one display 230, in response to the user's designated gesture obtained through the motion recognition camera 240-2 of FIG. 3B.

According to an embodiment, at least one display 230 may provide visual information to a user. For example, at least one display 230 may include a transparent or translucent lens. At least one display 230 may include a first display 230-1 and/or a second display 230-2 spaced apart from the first display 230-1. For example, the first display 230-1 and the second display 230-2 may be disposed in positions corresponding to the user's left eye and right eye, respectively.

Figure 3B:
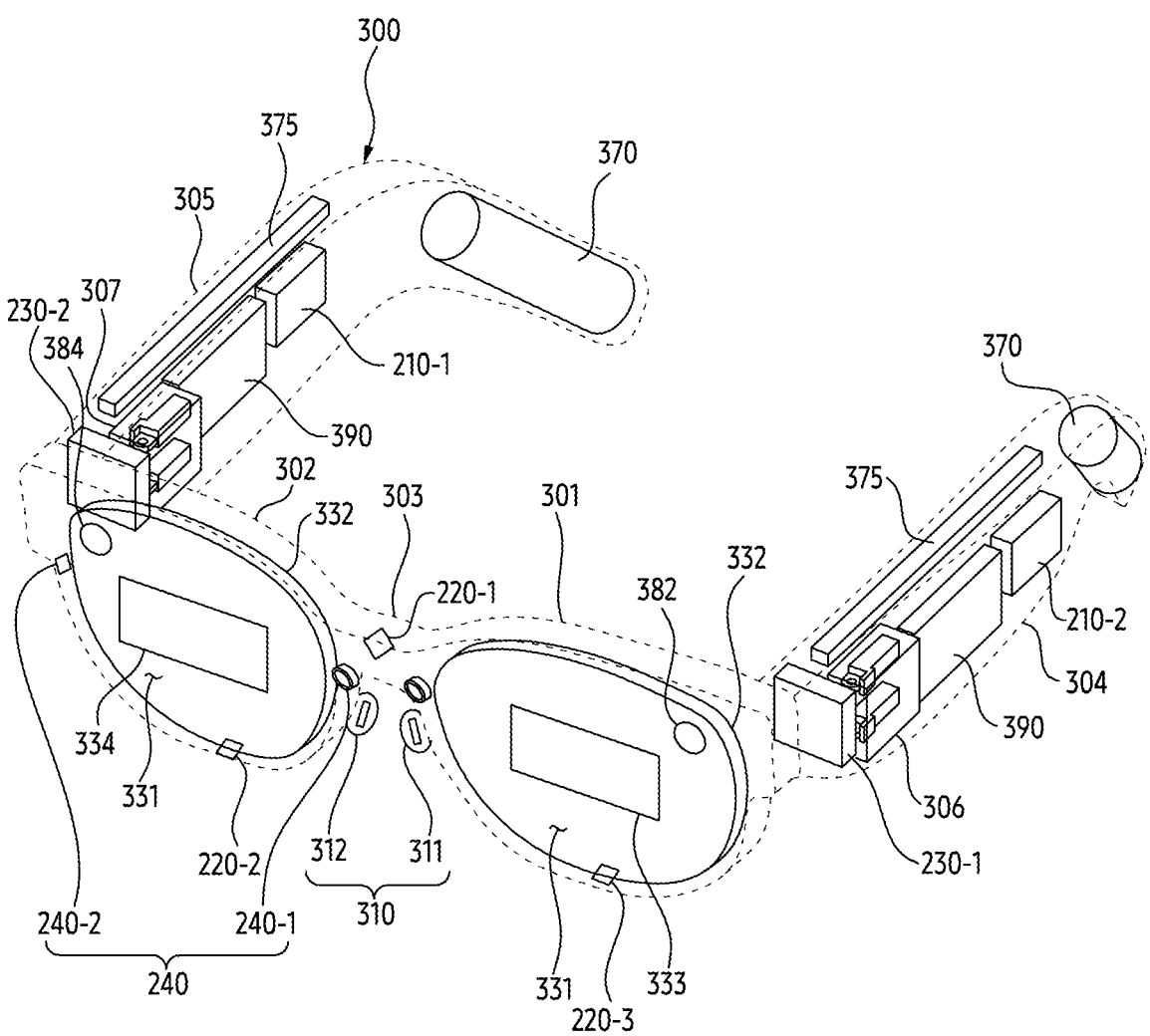
FIG. 3B is a perspective view illustrating an example of one or more hardware disposed in a wearable device according to an embodiment.

Referring to FIG. 3B, at least one display 230 may provide visual information transmitted from external light to the user through a lens included in at least one display 230, and other visual information distinguished from the visual information. The lens may be formed based on at least one of a Fresnel lens, a pancake lens, or a multi-channel lens. For example, at least one display 230 may include a first surface 331 and a second surface 332 opposite to the first surface 331. A display area may be formed on the second surface 332 of at least one display 230. When the user wears the wearable device 101, external light may be transmitted to the user, by being incident on the first surface 331 and penetrating through the second surface 332. For another example, at least one display 230 may display a virtual reality image to be coupled to a reality screen transmitted through the external light. The virtual reality image output from at least one display 230 may be transmitted to the user's eyes through one or more hardware (e.g., at least one optical device 382 and 384, and/or at least one wave guide 333 and 334) included in the electronic device 101.

According to an embodiment, the electronic device 101 may include at least one waveguide 333 and 334 that diffracts light transmitted from at least one display 230 and relayed by at least one optical device 382 and 384, and transmits the light to the user. At least one wave guide 333 and 334 may be formed based on at least one of glass, plastic, or polymer. A nano pattern may be formed at least a portion of the outside or inside of the at least one wave guide 333 and 334. The nano pattern may be formed based on a polygonal and/or a grating structure of the curved surface. Light incident to one end of at least one wave guide 333 and 334 may be propagated to the other end of at least one wave guide 333 and 334 by the nano pattern. At least one wave guide 333 and 334 may include at least one of at least one diffraction element (e.g. diffractive optical element (DOE), holographic optical element (HOE)) and a reflective element (e.g., a reflective mirror). For example, at least one wave guide 333 and 334 may be disposed in the wearable device 101 to guide the screen displayed by at least one display 230 to the user's eyes. For example, the screen may be transmitted to the user's eyes based on total internal reflection (TIR) generated in at least one wave guide 333 and 334.

The wearable device 101 may analyze an object included in a real image collected through a photographing camera (e.g., the camera 240 of FIG. 2) and combine a virtual object (e.g., the visual object 290 in FIG. 2) corresponding to an object to be provided with augmented reality among the analyzed objects, and display it on at least one display 230. The virtual object may include at least one of text and an image for various information related to the object included in the real image. The wearable device 101 may analyze an object based on a multi-camera such as a stereo camera. The wearable device 101 may execute time-of-flight (ToF) and/or simultaneous localization and mapping (SLAM) supported by the multi-camera to analyze the object. The user wearing the wearable device 101 may watch an image displayed on at least one display 230.

According to an embodiment, the frame 300 may be configured in a physical structure in which the wearable device 101 may be worn on the user's body. According to an embodiment, the frame 300 may be configured such that the first display 230-1 and the second display 230-2 may be located at positions corresponding to the user's left and right eyes, when the user wears the wearable device 101. The frame 300 may support at least one display 230. For example, the frame 300 may support the first display 230-1 and the second display 230-2 to be located at positions corresponding to the user's left and right eyes.

Referring to FIG. 3A, when the user wears the wearable device 101, the frame 300 may include an area 320 in which at least a part thereof contacts a part of the user's body. For example, the area 320 in contact with a part of the user's body of the frame 300 may include an area in contact with a part of the user's nose, a part of the user's ear, and a part of the side of the user's face. According to an embodiment, the frame 300 may include a nose pad 310 that contacts a part of the user's body. When the wearable device 101 is worn by the user, the nose pad 310 may contact a part of the user's nose. The frame 300 may include a first temple 304 and a second temple 305 in contact with another part of the user's body distinguished from the part of the user's body.

For example, the frame 300 may include a first rim 301 surrounding at least a part of the first display 230-1, a second rim 302 surrounding at least a part of the second display 230-2, a bridge 303 disposed between the first limb 301 and the second limb 302, a first pad 311 disposed along a part of an edge of the first rim 301 from one end of the bridge 303, a second pad 312 disposed along a part of an edge of the second rim 302 from another end of the bridge 303, the first temple 304 extending from the first rim 301 and fixed to a part of the wearer's ear, and the second temple 305 extending from the second rim 302 and fixed to a part of ear opposite to the ear. The first pad 311 and the second pad 312 may contact a part of the user's nose, and the first temple 304 and the second temple 305 may contact a part of the user's face and a part of the ear. The temples 304 and 305 may be rotatably connected to the rim through the hinge units 306 and 307 of FIG. 3B. The first temple 304 may be rotatably connected to the first rim 301 through the first hinge unit 306 disposed between the first rim 301 and the first temple 304. The second temple 305 may be rotatably connected to the second rim 302 through the second hinge unit 307 disposed between the second rim 302 and the second temple 305. According to an embodiment, the wearable device 101 may identify an external object (e.g., a user's fingertip) that touches the frame 300 and/or a gesture performed by the external object, using a touch sensor, a grip sensor, and/or a proximity sensor formed on at least a part of the surface of the frame 300.

According to an embodiment, the wearable device 101 may include hardware (e.g., hardware described above based on a block diagram of FIG. 2) that performs various functions. For example, the hardware may include a battery module 370, an antenna module 375, at least one optical device 382 and 384, a speaker 210, a microphone 220, a light emitting module (not shown), and/or a printed circuit board 390. Various hardware may be disposed within the frame 300.

According to an embodiment, the microphone 220 of the wearable device 101 may be disposed on at least a part of the frame 300 to obtain an acoustic signal. Although the first microphone 220-1 disposed on the nose pad 310, the second microphone 220-2 disposed on the second rim 302, and the third microphone 220-3 disposed on the first rim 301 are shown in FIG. 3B, the number and arrangement of the microphone 220 are not limited to the embodiment of FIG. 3B. When the number of microphone 220 included in the wearable device 101 is two or more, the wearable device 101 may identify a direction of the acoustic signal using a plurality of microphones disposed on different parts of the frame 300.

According to an embodiment, at least one optical device 382 and 384 may transmit a virtual object transmitted from at least one display 230 to at least one wave guide 333 and 334. For example, at least one optical device 382 and 384 may be a projector. At least one optical device 382 and 384 may be disposed adjacent to at least one display 230, or may be included in at least one display 230 as a part of at least one display 230. According to an embodiment, the wearable device 101 may include the first optical device 382 corresponding to the first display 230-1 and the second optical device 384 corresponding to the second display 230-2. For example, at least one optical device 382 and 384 may include the first optical device 382 disposed on an edge of the first display 230-1 and the second optical device 384 disposed on an edge of the second display 230-2. The first optical device 382 may transmit light output from the first display 230-1 to the first wave guide 333, and the second optical device 384 may transmit light output from the second display 230-2 to the second wave guide 334.

In an embodiment, the camera 240 (e.g., the camera 240 of FIG. 2) may include a photographing camera, an eye tracking camera (ET CAM) 240-1, and/or a motion recognition camera 240-2. The photographing camera, the eye tracking camera 240-1, and the motion recognition camera 240-2 may be disposed in different positions on the frame 300 and may perform different functions. The eye tracking camera 240-1 may output data indicating the gaze of the user wearing the wearable device 101. For example, the wearable device 101 may detect the gaze from an image including the user's pupil and obtained through the eye tracking camera 240-1. Although an example in which the eye tracking camera 240-1 is disposed toward the user's right eye is shown in FIG. 3B, but the embodiment is not limited thereto, and the eye tracking camera 240-1 may be disposed alone toward the user's left eye, or may be disposed toward all of both eyes.

In an embodiment, the photographing camera may photograph an actual image or background to be matched with a virtual image in order to implement augmented reality content or mixed reality content. The photographing camera may photograph an image of a specific object present in a position (e.g., FoV 270 of FIG. 2) viewed by the user, and provide the image to at least one display 230. At least one display 230 may display one image overlapping information on the actual image or background including the image of the specific object obtained using a photographing camera and a virtual image provided through at least one optical device 382 and 384. In an embodiment, the photographing camera may be disposed on the bridge 303 disposed between the first rim 301 and the second rim 302.

The eye tracking camera 240-1 may implement a more realistic augmented reality by matching the user's gaze with the visual information provided on at least one display 230, by tracking the gaze of the user wearing the wearable device 101. For example, when the user looks straight ahead, the wearable device 101 may naturally display environmental information related to the user's front surface on the at least one display 230 at a place where the user is positioned. The eye tracking camera 240-1 may be configured to capture an image of the user's pupil in order to determine the user's gaze. For example, the eye tracking camera 240-1 may receive gaze detection light reflected from the user's pupil and track the user's gaze based on the position and movement of the received gaze detection light. In an embodiment, the eye tracking camera 240-1 may be disposed in a position corresponding to the user's left and right eyes. For example, the eye tracking camera 240-1 may be disposed toward a direction in which the user wearing the wearable device 101 is located, within the first rim 301 and/or the second rim 302.

The motion recognition camera 240-2 may provide a specific event to a screen provided on the at least one display 230, by recognizing the movement of the whole or part of the user's body, such as the user's trunk, hands, or face. The motion recognition camera 240-2 may obtain a signal corresponding to the motion by recognizing the user's gesture and provide an indication corresponding to the signal to the at least one display 230. The processor may identify a signal corresponding to the operation and perform a designated function based on the identification. In an embodiment, the motion recognition camera 240-2 may be disposed on the first rim 301 and/or the second rim 302.

The camera 240 included in the wearable device 101 is not limited to the eye tracking camera 240-1 and motion recognition camera 240-2 described above. For example, the wearable device 101 may identify an external object (e.g., the external object 280 in FIG. 2) included in the FoV using the camera 240 disposed toward the user's FoV (e.g., FoV 270 in FIG. 2). Identification of the external object by the wearable device 101 may be performed based on a sensor for identifying a distance between the wearable device 101 and the external object, such as a depth sensor, and/or a time of flight (ToF) sensor. The camera 240 disposed toward the FoV may support an autofocus function and/or an optical image stabilization (OIS) function. For example, the wearable device 101 may include a camera 240 (e.g., a face tracking (FT) camera) disposed toward the face to obtain an image including a face of a user wearing the wearable device 101.

Although not illustrated, according to an embodiment, the wearable device 101 may further include a light source (e.g., an LED) that emits light toward a subject (e.g., a user's eye, face, and/or an external object within FoV) photographed using the camera 240. The light source may include an infrared wavelength LED. The light source may be disposed on at least one of the frame 300 and the hinge units 306 and 307.

According to an embodiment, the battery module 370 may supply power to electronic components of the wearable device 101. In an embodiment, the battery module 370 may be disposed in the first temple 304 and/or the second temple 305. For example, the battery module 370 may be a plurality of battery modules 370. The plurality of battery modules 370 may be disposed on each of the first temple 304 and the second temple 305. In an embodiment, the battery module 370 may be disposed at an end of the first temple 304 and/or the second temple 305.

The antenna module 375 may transmit a signal or power to the outside of the wearable device 101 or receive a signal or power from the outside. The antenna module 375 may be electrically and/or operably connected to the communication circuit 250 of FIG. 2. In an embodiment, the antenna module 375 may be disposed in the first temple 304 and/or the second temple 305. For example, the antenna module 375 may be disposed adjacent to one surface of the first temple 304 and/or the second temple 305.

The speaker 210 may output an acoustic signal to the outside of the wearable device 101. The sound output module may be referred to as a speaker. In an embodiment, the speaker 210 may be disposed in the first temple 304 and/or the second temple 305 to be disposed adjacent to the ear of the user wearing the wearable device 101. For example, the speaker 210 may include a second speaker 210-2 disposed adjacent to the user's right ear by being disposed within the first temple 304, and a first speaker

210-1 disposed adjacent to the user's left ear by being disposed within the second temple 305.

The light emitting module (not shown) may include at least one light emitting element. In order to visually provide information on a specific state of the wearable device 101 to the user, the light emitting module may emit light of a color corresponding to the specific state or may emit light in an operation corresponding to the specific state. For example, when charging is required, the wearable device 101 may emit red light at a certain period. In an embodiment, the light emitting module may be disposed on the first rim 301 and/or the second rim 302.

Referring to FIG. 3B, according to an embodiment, the wearable device 101 may include a printed circuit board (PCB) 390. The PCB 390 may be included in at least one of the first temple 304 and the second temple 305. The PCB 390 may include an interposer disposed between at least two sub-PCBs. On the PCB 390, one or more hardware (e.g., hardware illustrated by different blocks of FIG. 2) included in the wearable device 101 may be disposed. The wearable device 101 may include a flexible PCB (FPCB) for interconnecting the hardware.

According to an embodiment, the wearable device 101 may include at least one of a gyro sensor, a gravity sensor, and/or an acceleration sensor for detecting a posture of the wearable device 101 and/or a posture of the body part (e.g., head) of a user wearing the wearable device 101. Each of the gravity sensor and the acceleration sensor may measure gravity acceleration and/or acceleration based on designated three-dimensional axes perpendicular to each other (e.g., x-axis, y-axis, and z-axis). The gyro sensor may measure angular velocity of each of the designated three-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify a user's motion and/or gesture performed to execute or cease a specific function of the wearable device 101 based on the IMU.

Figure 4A:
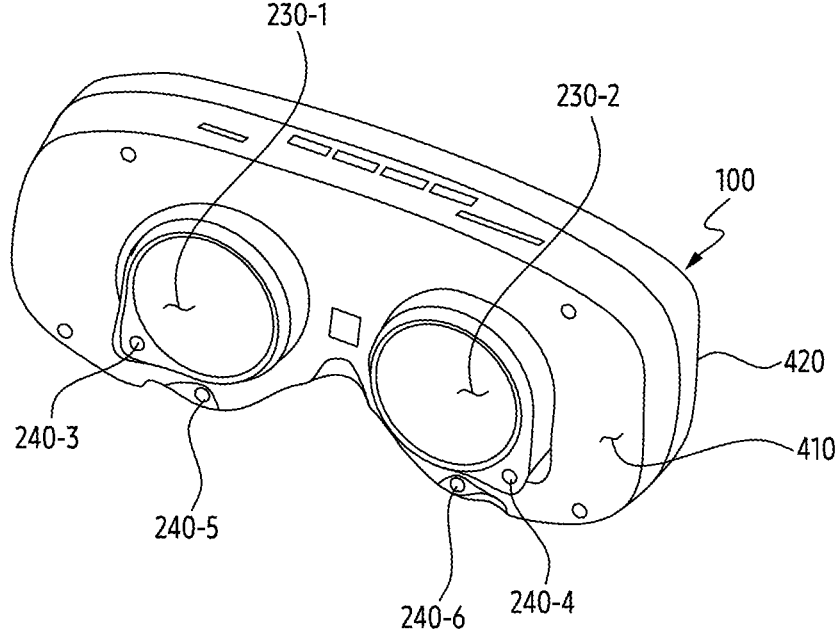
FIGS. 4A and 4B are perspective views illustrating an example of an appearance of a wearable device according to an embodiment.
Figure 4B:
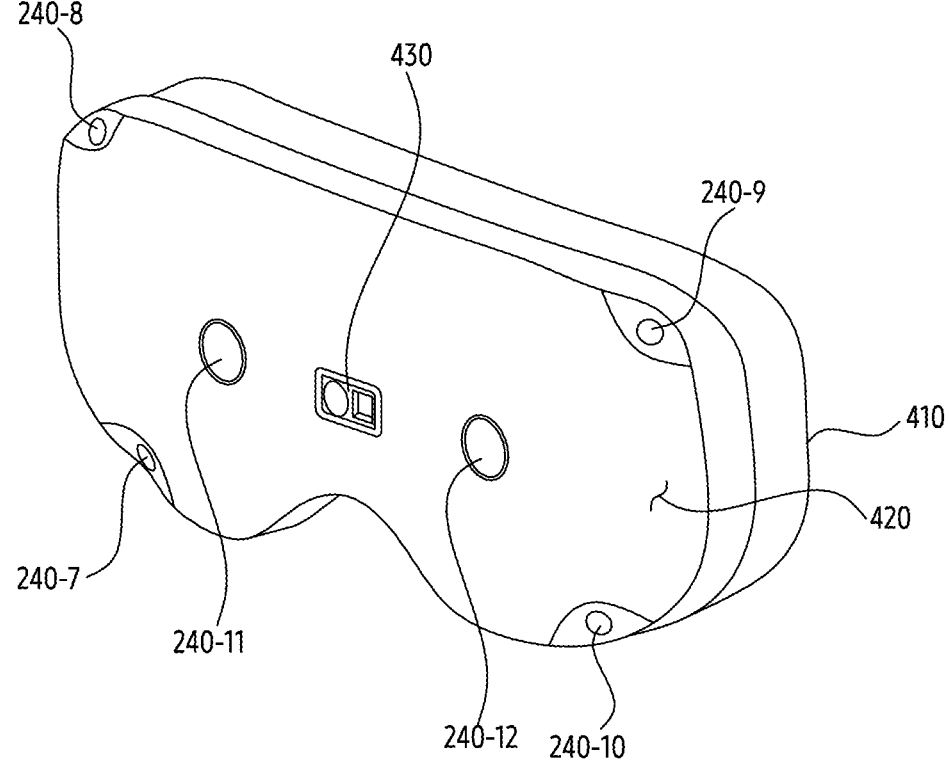

FIGS. 4A and 4B are perspective views illustrating examples of an appearance of a wearable device 100, according to an embodiment. The wearable device 101 of FIGS. 4A and/or 4B may be an example of the wearable device 101 of FIG. 2. According to an embodiment, an example of the appearance of a first surface 410 of the housing of the wearable device 101 may be illustrated in FIG. 4A, and an example of the appearance of a second surface 420 opposite to the first surface 410 may be illustrated in FIG. 4B.

Referring to FIG. 4A, according to an embodiment, the first surface 410 of the wearable device 101 may have an attachable shape on the user's body part (e.g., the user's face). Although not illustrated, the wearable device 101 may further include a strap for being fixed on the user's body part, and/or one or more temples (e.g., the first temple 304 and/or the second temple 305 in FIGS. 3A to 3B). A first display 230-1 for outputting an image to the left eye among both eyes of the user and a second display 230-2 for outputting an image to the right eye among both eyes may be disposed on the first surface 410. The wearable device 101 may further include rubber or silicon packing formed on the first surface 410 and for preventing and/or reducing interference by light (e.g., ambient light) different from light emitted from the first display 230-1 and the second display 230-2.

According to an embodiment, the wearable device 101 may include cameras 240-3 and 240-4 for photographing and/or tracking both eyes of the user adjacent to each of the first display 230-1 and the second display 230-2. The cameras 240-3 and 240-4 may be referred to as an ET camera. According to an embodiment, the wearable device 101 may include cameras 240-5 and 240-6 for photographing and/or recognizing a user's face. The cameras 240-5 and 240-6 may be referred to as FT cameras.

Referring to FIG. 4B, a camera (e.g., cameras 240-7, 240-8, 240-9, 240-10, 240-11, 240-12) and/or a sensor (e.g., a depth sensor 430) for obtaining information related to the external environment of the wearable device 101 may be disposed on the second surface 420 opposite to the first surface 410 of FIG. 4A. For example, cameras 240-7, 240-8, 240-9, and 240-10 may be disposed on the second surface 420 to recognize an external object (e.g., the external object 280 in FIG. 2) different from the wearable device 101. For example, the wearable device 101 may obtain an image and/or a video to be transmitted to each of the user's eyes using the cameras 240-11 and 240-12. The camera 240-11 may be disposed on the second surface 420 of the wearable device 101 to obtain an image to be displayed through the second display 230-2 corresponding to the right eye among both eyes. The camera 240-12 may be disposed on the second surface 420 of the wearable device 101 to obtain an image to be displayed through the first display 230-1 corresponding to the left eye among both eyes.

According to an embodiment, the wearable device 101 may include the depth sensor 430 disposed on the second surface 420 to identify a distance between the wearable device 101 and the external object. The wearable device 101 may obtain spatial information (e.g., depth map) on at least a part of the FoV (e.g., FoV 270 in FIG. 2) of the user wearing the wearable device 101 using the depth sensor 430.

Although not shown, a microphone (e.g., the microphone 220 in FIG. 2) for obtaining sound output from an external object may be disposed on the second surface 420 of the wearable device 101. The number of microphones may be one or more according to the embodiment.

As described above, according to an embodiment, the wearable device 101 may have a form factor to be worn on the user's head. The wearable device 101 may provide a user experience based on augmented reality, virtual reality, and/or mixed reality in a state worn on the head. In a state in which the wearable device 101 outputs an audio signal through the speaker (e.g., the speaker 210 of FIG. 2), when the volume of the audio signal is different from the volume of an external sound (e.g., a sound generated from an external object adjacent to the wearable device 101), a user wearing the wearable device 101 may feel a sense of heterogeneity. In order to compensate for the sense of heterogeneity, the wearable device 101 may adjust the volume of the audio signal based on the external sound. The wearable device 101 may realistically reproduce the audio signal by adjusting the volume of the audio signal based on the external sound.

Hereinafter, referring to FIGS. 5A and 5B, according to an embodiment, an operation of adjusting a volume of an audio signal by the wearable device 101 based on the external sound will be described.

Figure 5A:
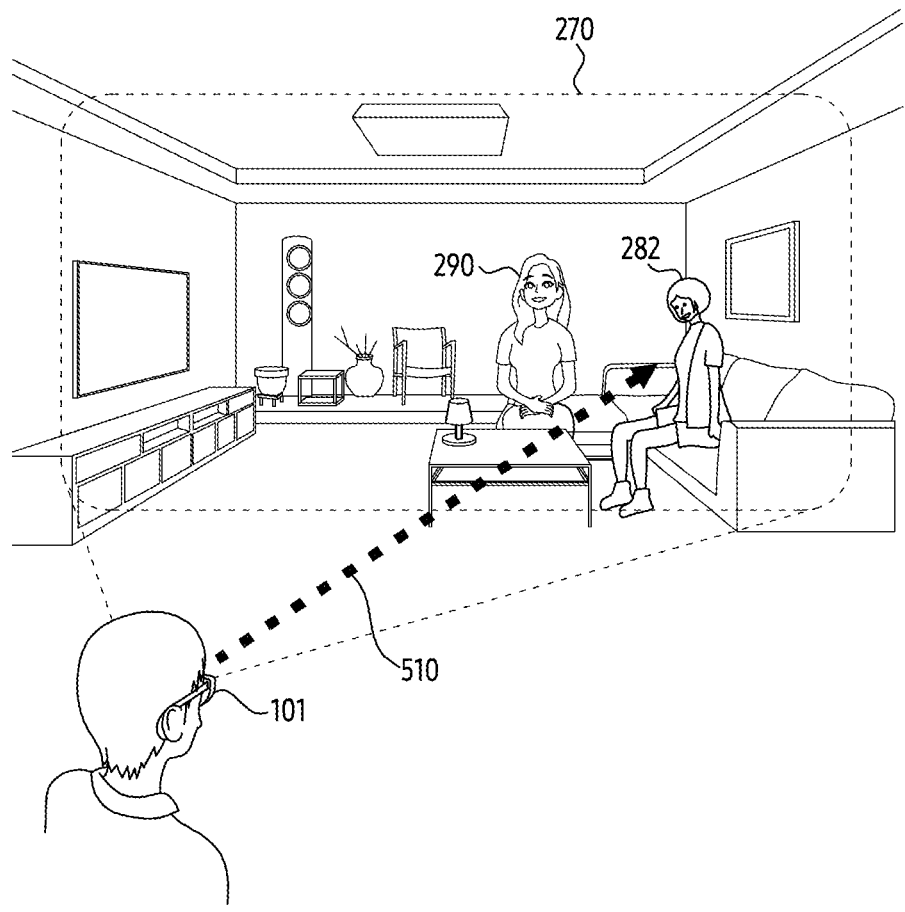
FIGS. 5A and 5B are diagrams illustrating an example of an operation in which a wearable device identifies a position of an external object and a position of a visual object based on a virtual space, according to an embodiment.
Figure 5B:
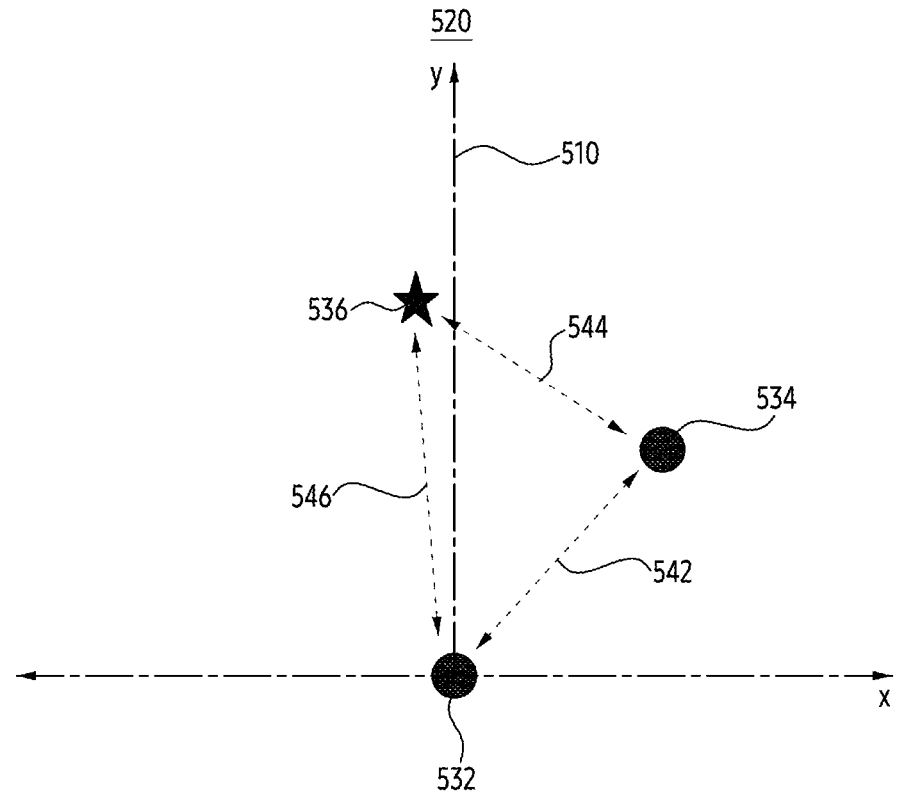

FIGS. 5A and 5B are diagrams illustrating an example of an operation in which a wearable device 101 identifies a position of an external object 282 and a position of a visual object 290 based on a virtual space, according to an embodiment. The wearable device 101 of FIGS. 5A and 5B may be an example of the wearable device 101 of FIG. 2. For example, the wearable device 101 of FIGS. 2, 3A to 3B, and/or 4A to 4B may include the wearable device 101 of FIGS. 5A and 5B.

Referring to FIG. 5A, an example state in which the wearable device 101 is worn by a user is illustrated. In the state of FIG. 5A, it is assumed that an external object 282 such as a person exists in a space adjacent to the wearable device 101. According to an embodiment, the wearable device 101 may stimulate the user's sight and/or hearing based on the space including the external object 282.

According to an embodiment, the wearable device 101 may have a structure for transmitting sound generated by the external object 282 to a user wearing wearable device 101. For example, the wearable device 101 may have a structure for directly transmitting the sound to the external auditory meatus of the user wearing the wearable device 101, as shown in the first temple 302 and the second temple 304 of FIGS. 3A and 3B. For example, the wearable device 101 may output an audio signal corresponding to the sound toward the external auditory meatus using a speaker (e.g., the speaker 210 in FIG. 2) covering the external auditory meatus. The wearable device 101 may include a microphone (e.g., the microphone 220 in FIG. 2) for receiving a sound generated in a space adjacent to the wearable device 101, such as a sound generated by the external object 282. The number of microphones and/or speakers included in the wearable device 101 may be two or more.

According to an embodiment, the wearable device 101 may display a space adjacent to the wearable device 101 to the user using a display (e.g., the display 230 of FIG. 2). The display may be disposed to cover at least a part of both eyes of the user while the wearable device 101 is worn by the user. In an embodiment, the display may directly transmit light incident toward the second surface opposite to the first surface to the first surface of the display disposed toward the user, based on a transparent or translucent material. In an embodiment, the wearable device 101 may indirectly transmit light incident toward the second surface to the user through the display, by displaying an image obtained using a camera disposed on the second surface (e.g., the second surface 420 in FIG. 4B) opposite to the first surface of the wearable device 101 disposed toward the user (e.g., the first surface 410 in FIG. 4A) in a display disposed on the first surface. For example, the wearable device 101 may indirectly transmit the light through the display based on a transparent mode ("transparent mode" or "see through mode").

Referring to FIG. 5A, according to an embodiment, an example state in which the wearable device 101 displays the visual object 290 in FoV 270 using a display is illustrated. According to an embodiment, the wearable device 101 may display the visual object 290 in association with the display and/or the external object 282 shown to the user through FoV 270. The visual object 290 may have a form based on account information related to the external electronic device connected to the wearable device 101 through a network service (e.g., video conference) supported based on the wearable device 101. For example, the account information may be uniquely assigned to a user logged into the external electronic device.

According to an embodiment, the wearable device 101 may set a position of the visual object 290 in FoV 270 based on a two-dimensional and/or three-dimensional virtual space. For example, the wearable device 101 may obtain a virtual space to which the external space of the wearable device 101 including FoV 270 is mapped using a camera (e.g., the camera 240 of FIG. 2). The virtual space may be formed based on a point (e.g., an origin) corresponding to the position of the wearable device 101. The wearable device 101 may identify or select a part of the display in which the visual object 290 is to be displayed based on a point of the visual object 290 in the virtual space.

Referring to FIG. 5A, the wearable device 101 may receive information related to the visual object 290 using a communication circuit (e.g., the communication circuit 250 of FIG. 2). The information may indicate the shape and/or size of the visual object 290. The information may include data for adjusting the position of the visual object 290 in a virtual space based on an input received by an external electronic device corresponding to the visual object 290. For example, based on identifying the data for adjusting the position of the visual object 290 from the information, the wearable device 101 may adjust the position of the visual object 290 in FoV 270 by changing the display of the visual object 290. For example, based on the data, the wearable device 101 may adjust a point corresponding to the visual object 290 within the virtual space. An operation of the wearable device 101 changing the display of the visual object 290 is not limited to the above-described operation. For example, the wearable device 101 may change the display of the visual object 290 based on the motion of the user wearing wearable device 101. For example, when a direction 510 of FoV 270 is adjusted by the user's motion, the wearable device 101 may change the position and/or size of the visual object 290 based on the adjusted direction 510.

According to an embodiment, the information related to the visual object 290 received by the wearable device 101 may include an audio signal transmitted from an external electronic device corresponding to the visual object 290. For example, in case that the visual object 290 corresponds to an external electronic device connected through a network service such as a video conference, the wearable device 101 may receive the audio signal including a statement of a user of the external electronic device, and received through a microphone of the external electronic device from the external electronic device. Based on receiving the audio signal, the wearable device 101 may output the received audio signal using a speaker (e.g., the speaker 210 in FIG. 2).

According to an embodiment, the wearable device 101 may output an audio signal related to the visual object 290 based on the position relationship between the external object 282 and the visual object 290 shown through the FoV 270. For example, the wearable device 101 may adjust the volume of the audio signal based on the position relationship. The wearable device 101 may adjust the volume of the audio signal based on the volume of the sound and the position relationship in a state of identifying the volume of sound generated from the external object 282. For example, the wearable device 101 may obtain a sound of an outer space of the wearable device 101 to identify the volume of sound generated from the external object 282 using a microphone.

According to an embodiment, the wearable device 101 may identify a direction of sound received through a microphone. The direction of the sound may be an azimuth angle of a source (e.g., external object 282) that outputs the sound for the wearable device 101. In an embodiment in which at least two microphones are disposed on different portions of the wearable device 101, the wearable device 101 may identify a phase difference of sound received through each of the microphones. Based on the phase difference, the wearable device 101 may obtain an azimuth angle of sound received through the microphone.

According to an embodiment, the wearable device 101 may identify whether the sound received through the microphone is output by the external object 282 in order to adjust the volume of the audio signal corresponding to the visual object 290 using sound output from the external object 282. For example, the wearable device 101 may identify whether the sound is output by the external object 282 by comparing the azimuth angle of the sound received through the microphone with the position of the external object 282 within the FoV 270. The wearable device 101 may obtain the position of the external object 282 within the FoV 270 based on the image and/or video obtained using the camera. Based on identifying that a difference between the azimuth angle and the obtained position is less than a designated range, the wearable device 101 may identify whether the sound received through the microphone is output from the external object 282.

According to an embodiment, the wearable device 101 may adjust the volume and/or direction of the audio signal based on the volume of sound output from external object 282 and/or azimuth angle. Adjusting a volume and/or direction of the audio signal by the wearable device 101 may be performed based on at least one of the position in the virtual space of the visual object 290 corresponding to the audio signal or the position in the virtual space of the external object 282. Referring to FIG. 5B, in the state of FIG. 5A, an example state 520 of a virtual space obtained by the wearable device 101 from the external space is illustrated.

Referring to FIG. 5B, according to an embodiment, the wearable device 101 may identify a point 532 which is the origin of the virtual space as a position within the virtual space of the wearable device 101. The direction 510 of the y-axis of the virtual space may match the direction 510 of the FoV 270 of FIG. 5A. The wearable device 101 may determine the position of the external object 282 identified from the FoV 270 using a camera, based on the point 532 corresponding to the position of the wearable device 101 within the virtual space. For example, based on identifying the external object 282 within the image obtained from the camera, the wearable device 101 may determine the point 534 within the virtual space as a position within the virtual space of the external object 282 based on the position of the external object 282. For example, within a virtual space, an angle between a line connecting the points 532 and 534 and the y-axis may be an angle between the direction 510 of the FoV 270 identified by the wearable device 101 based on the image and the external object 282. A distance 542 between the points 532 and 534 may be related to a distance between the wearable device 101 and the external object 282 identified by the wearable device 101 based on the image.

Referring to FIG. 5B, the wearable device 101 may determine a point 536 within the virtual space as a position of the visual object 290 of FIG. 5A. The angle between the line connecting the points 532 and 536 and the y-axis may match the angle between the visual object 290 displayed by the wearable device 101 in the display and the direction 510 of the FoV 270. Based on the distance 546 between the points 532 and 536, the wearable device 101 may adjust the size of the visual object 290 displayed in the display. According to an embodiment, the wearable device 101 may adjust a position of the point 536 within the coordinate space based on the movement of the user wearing the wearable device 101. The wearable device 101 may receive information for adjusting the position of the point 536 within the virtual space from an external electronic device corresponding to the visual object 290. As the position of the point 536 is adjusted, the wearable device 101 may change the position and/or size of the visual object 290 within the display.

According to an embodiment, the wearable device 101 may adjust the volume and/or direction of the audio signal corresponding to the visual object 290, based on at least one of the position (e.g., the point 532) of the wearable device 101 mapped to the virtual space, the position (e.g., the point 534) of the external object 282 mapped to the virtual space, or the position (e.g., the point 536) of the visual object 290 mapped to the virtual space. For example, based on identifying the first volume of sound generated from the external object 282, the wearable device 101 may identify a position relationship of points 534 and 536 indicating respectively the position of the external object 282 and the position of the visual object 290 in the virtual space. The wearable device 101 may obtain a second volume of an audio signal corresponding to the visual object 290 by adjusting the first volume based on the position relationship. For example, the wearable device 101 may obtain the second volume by adjusting the first volume based on the distance 544 between the points 534 and 536.

In state 520 of FIG. 5B, the distance 546 between point 536 that is the position of the visual object 290 mapped to the virtual space and the point 532 that is the position of the wearable device 101 mapped to the virtual space may be greater than the distance 542 between the point 534 that is the position of the external object 282 mapped to the virtual space and the point 532. When identifying the distance 546 exceeding the distance 542, the wearable device 101 may obtain the second volume of the audio signal corresponding to the visual object 290 by proportionally decreasing the first volume of sound generated by the external object 282 based on the ratio between the distances 542 and 546, and/or the distance 544.

According to an embodiment, the wearable device 101 may adjust an azimuth angle of the audio signal corresponding to the visual object 290 mapped to the point 536, based on the azimuth angle of the sound of the external object 282 mapped to the point 534. For example, based on at least one of the distance 544 between the points 534 and 536 or the azimuth angle of the sound of the external object 282, the wearable device 101 may obtain an azimuth angle of the audio signal. For example, the wearable device 101 may obtain the azimuth angle of the audio signal based on the angle between the line connecting the point 536 corresponding to the visual object 290 within the virtual space and the point 532 corresponding to the wearable device 101 within the virtual space and the y-axis (or the x-axis). Based on the obtained azimuth angle, the wearable device 101 may adjust a phase difference of audio signals output from each of the speakers corresponding to each of the two ears. Based on the phase difference, the wearable device 101 may provide a three-dimensional effect related to the audio signal to a user wearing the speaker.

As described above, according to an embodiment, the wearable device 101 may adjust the volume and/or azimuth angle of the audio signal corresponding to the visual object 290 based on the position of the external object 282 within the FoV 270 obtained using the camera, and the position of the visual object 290. In a state in which each of positions of the external object 282 and the visual object 290 are mapped to the points 534 and 536 in the virtual space, the wearable device 101 may obtain a sound of an external space in which the wearable device 101 is disposed. The device 101 may identify whether the obtained sound is generated from the external object 282 based on the image obtained using the wearable camera. When the obtained sound is generated from the external object 282, the wearable device 101 may obtain a second volume of an audio signal corresponding to the visual object 290 by adjusting the first volume of the obtained sound based on the points 534, 536 within the virtual space. The wearable device 101 may acoustically represent the position relationship between the external object 282 visualized through the FoV 270 and the visual object 290, by outputting the audio signal based on the second volume.

Hereinafter, referring to FIGS. 6A and 6B, according to an embodiment, an example of a UI displayed by the wearable device 101 within a state of adjusting the volume of an audio signal based on the volume of sound output from the external object 282 within the state of FIG. 5A will be described in greater detail.

Figure 6A:
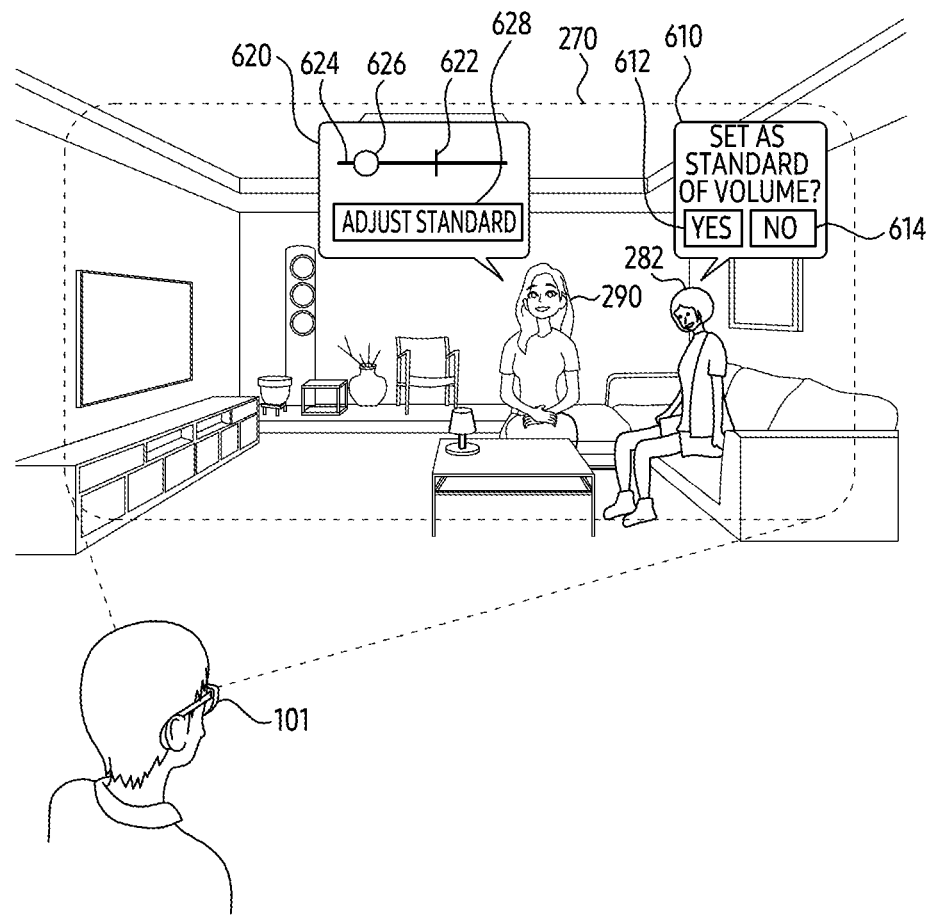
FIGS. 6A and 6B are diagrams illustrating an example of a UI provided by a wearable device to adjust a volume of an audio signal output through a speaker, according to an embodiment.
Figure 6B:
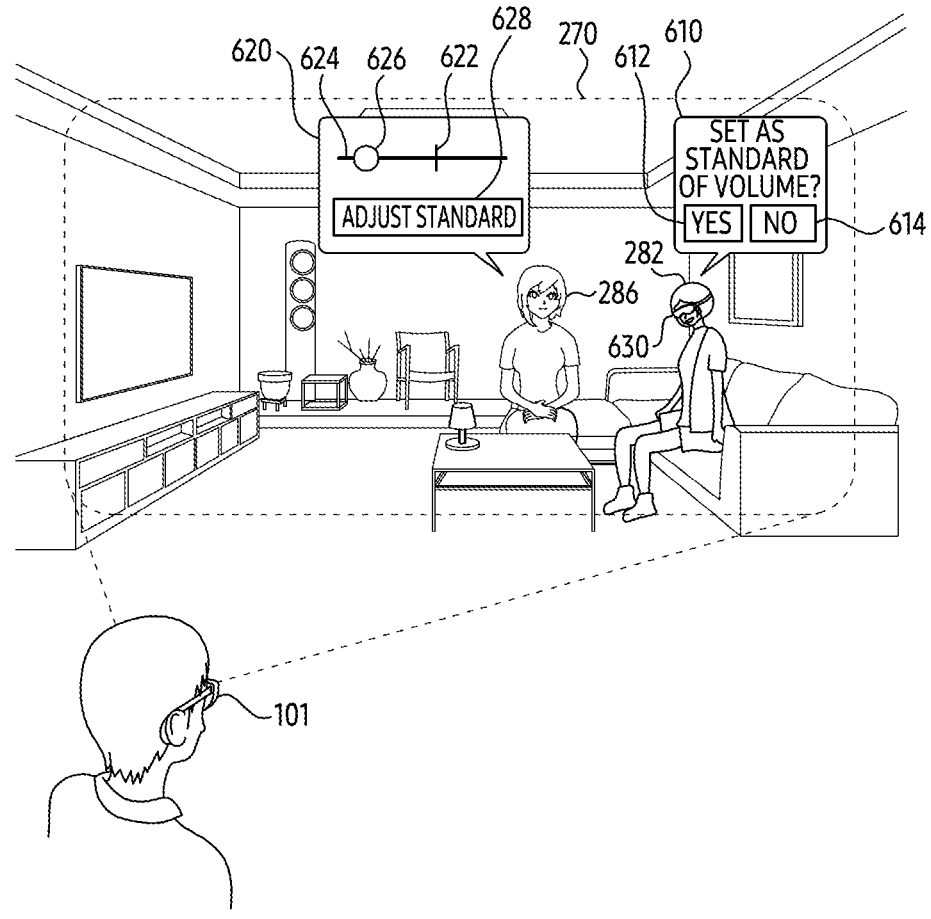

FIGS. 6A and 6B are diagrams illustrating an example of a UI provided by a wearable device 101 to adjust a volume of an audio signal output through a speaker, according to an embodiment. The wearable device 101 of FIGS. 6A and 6B may be an example of the wearable device 101 of FIG. 2. For example, the wearable device 101 of FIGS. 2, 3A and 3B, and/or 4A may include the wearable device 101 of FIGS. 6A and 6B. The state of FIG. 6A may be related to the state of FIG. 5A.

According to an embodiment, the wearable device 101 may identify a direction (or azimuth angle) of the sound in response to detecting sound through the microphone (e.g., the microphone 220 of FIG. 2). The wearable device 101 may obtain an image that is identified using a camera (e.g., the camera 240 of FIG. 2) and includes at least a part of the FoV 270. The wearable device 101 may identify a portion corresponding to the identified direction in the obtained image. Based on identifying the external object 282 from the portion, the wearable device 101 may determine that the sound is output from the external object 282.

In an embodiment, identifying the external object 282 from the image by the wearable device 101 may be performed based on a neural network trained for vision recognition and/or at least one feature point in the image. For example, the wearable device 101 may identify whether the sound detected through the microphone is output from the external object 282 based on a category of the external object 282 identified from the image. In an example case of FIG. 6A, the wearable device 101 may determine that the sound is output from the external object 282 based on the identifying the external object 282 included in a designated category representing a person, and identifying that the first direction of the external object 282 within FoV 270 and the second direction of the sound detected through the microphone are matched.

In an embodiment, based on receiving a sound output from the external object 282 and having the first volume, the wearable device 101 may adjust the second volume of the audio signal corresponding to the visual object 290 based on the first volume. Referring to FIG. 6A, the wearable device 101 may display a visual object 610 such as a pop-up window for guiding that the volume of the audio signal is adjusted based on the sound output from the external object 282, in the FoV 270 using the display (e.g., the display 230 of FIG. 2). Within the visual object 610, the wearable device 101 may display a designated text (e.g., "Set as standard of the volume?") for guiding that the first volume of the sound output from the external object 282 is used as a reference volume used for adjusting the second volume of the audio signal. The wearable device 101 may display a visual object 612 that is a button (e.g., a button including designated text such as "yes") for confirming that the first volume is used as the reference volume.

According to an embodiment, the wearable device 101 may display a visual object 614 that is a button (e.g., a button including designated text such as "no") for ceasing the display of the visual object 610 within the visual object 610. The button may be selected based on gestures detected by the wearable device 101 and performed by a user wearing the wearable device 101. For example, the gesture may include at least one of a gesture of tapping the wearable device 101, a user's gaze detected by the wearable device 101, or a gesture of the user's body part (e.g., hand) identified through the camera of the wearable device 101. For example, in response to an input indicating that the visual object 614 is selected, the wearable device 101 may at least temporarily cease displaying the visual object 610. In response to an input indicating that the visual object 612 is selected, the wearable device 101 may obtain a second volume of an audio signal corresponding to the visual object 290 from the first volume.

In an embodiment, the wearable device 101 may display a visual object 620 that is a pop-up window for adjusting a volume of an audio signal corresponding to the visual object 290 in association with the visual object 290. For example, the wearable device 101 may display the visual object 620 adjacent to the visual object 290 shown through the FoV 270. The embodiment is not limited thereto, and the wearable device 101 may display the visual object 620 as an overlap on at least a portion of the visual object 290. Within the visual object 620, the wearable device 101 may display a line 624 formed along a designated direction (e.g. width direction among width direction and height direction of FoV 270) and a visual object 626 superimposed on the line 624. Although the circular visual object 626 is illustrated, the embodiment is not limited thereto, and the visual object 626 may include an image and/or an icon.

According to an embodiment, the wearable device 101 may visualize a volume of an audio signal corresponding to the visual object 290 based on the position of the visual object 626 in the line 624. The ratio of the line 624 divided by the visual object 626 may be the ratio of the maximum volume of the speaker (e.g., the speaker 210 of FIG. 2) of the wearable device 101 and the volume of the audio signal. The wearable device 101 may receive an input indicating that the position of the visual object 626 is adjusted within the line 624 based on the user's gesture wearing the wearable device 101. Based on the input, the wearable device 101 may change the position of the visual object 626. The wearable device 101 may adjust the volume of the audio signal based on the position of the visual object 626 changed in the line 624. Although not shown, the wearable device 101 may visualize the volume based on a numerical value displayed in the visual object 620.

According to an embodiment, the wearable device 101 may adjust the second volume of the audio signal corresponding to the visual object 290 based on the first volume of sound output from the external object 282. For example, adjusting the second volume based on the first volume by the wearable device 101 may be initiated based on an input indicating that the visual object 612 is selected. According to an embodiment, the wearable device 101 may display a visual object related to the first volume in the visual object 620 for adjusting the second volume of the audio signal. For example, the wearable device 101 may represent the first volume identified from the external object 282, based on the line 622 overlapped on the line 624. The line 622 and the line 624 may be perpendicular to each other.

According to an embodiment, the wearable device 101 may visualize the first volume of the sound of the external object 282 identified through the microphone and the second volume of the audio signal, based on the positions of the line 622 overlapped on the line 624 and the visual object 626. For example, the wearable device 101 may display the second volume obtained by adjusting the first volume, by adjusting the interval between the line 622 and the visual object 626 within the line 624. In an example case in which the wearable device 101 identifies positions in the virtual space of the visual object 290 and the external object 282 as shown in the state 520 of FIG. 5B, the second volume corresponding to the visual object 290 may be lower than the first volume corresponding to the external object 282. Since the second volume is lower than the first volume, the wearable device 101 may indicate that the second volume is lower than the first volume by displaying the visual object 626 closer to the left (or origin) than the line 622.

According to an embodiment, the wearable device 101 may display a visual object 628 such as a button for adjusting a reference volume used to adjust the volume of the audio signal (e.g., a button with a designated text such as "reference adjustment") in the visual object 620 for adjusting the volume of the audio signal corresponding to the visual object 290. In an example case of FIG. 6A, in which the wearable device 101 adjusts the volume of the audio signal based on the volume of the sound output from the external object 282, the visual object 628 may be related to a function of changing an external object used to adjust the volume of the audio signal to another external object different from the external object 282. Based on the input indicating that the visual object 628 is selected, the wearable device 101 may request the user to select an external object to be used to adjust the volume of the audio signal from among one or more external objects displayed in the FoV 270.

Referring to FIG. 6B, according to an embodiment, an example state in which the wearable device 101 receives an audio signal output from the external object 286 through the external electronic device 630 is illustrated. In an embodiment of FIG. 6B, in which the external object 282 is another user different from a user wearing the wearable device 101, the external electronic device 630 may include a wearable device worn by the other user. The embodiment is not limited thereto, and the external electronic device 630 may include an electronic device (e.g., a terminal) different from the wearable device. The wearable device 101 may establish a communication link between the wearable device 101 and the external electronic device 630 based on identifying the external electronic device 630.

The external electronic device 630 may include one or more microphones for recording sound. The external electronic device 630 may transmit an audio signal received through the one or more microphones to the wearable device 101. The external electronic device 630 may transmit information related to the audio signal. The information may be transmitted to the wearable device 101 together with the audio signal based on the external electronic device 630. The information may include information indicating a source of the audio signal. The information may include a volume of the audio signal measured by the external electronic device 630. Referring to FIG. 6B, in a state in which an audio signal including sound output from the external object 282 is transmitted to the wearable device 101, the external electronic device 630 may transmit information including the volume of the audio signal to the wearable device 101.

According to an embodiment, the wearable device 101 may output an audio signal received from the external electronic device 630 through a speaker included in the wearable device 101. The wearable device 101 may receive information related to the audio signal from the external electronic device 630. Based on the volume of the audio signal included in the information and measured by the external electronic device 630, the wearable device 101 may adjust the volume of the audio signal output through the speaker of the wearable device 101. For example, the wearable device 101 may output the sound output from the external object 286 to the user wearing the wearable device 101 based on the audio signal of the external object 286 obtained by the external electronic device 630 adjacent to the external object 286. For example, in an environment where the sound output from the external object 286 cannot be directly transmitted to the wearable device 101, the wearable device 101 may transmit the sound output from the external object 286 to the user wearing the wearable device 101 based on the audio signal received from the external electronic device 630.

According to an embodiment, the wearable device 101 may adjust the second volume related to the external object 286 based on the first volume (e.g., the volume of sound output from the external object 282) of the audio signal identified by the external electronic device 630. The first volume may be included in information transmitted from the external electronic device 630 to the wearable device 101. For example, the first volume may be used as a reference volume for the second volume. The second volume may include a volume of an audio signal related to the external object 286 obtained based on the external electronic device 630 and/or the wearable device 101. Referring to FIG. 6B, the wearable device 101 may notify that the first volume of the audio signal received through the external electronic device 630 is used as the reference volume based on the visual object 610 adjacent to the external electronic device 630. Based on the visual objects 612 and 614 included in the visual object 610, the wearable device 101 may receive an input indicating whether to set the first volume as the reference volume from the user. In a state in which the first volume is set as the reference volume, the wearable device 101 may display the visual object 620 for adjusting the second volume corresponding to the external object 286 in the FoV 270. The line 622 in the visual object 620 may correspond to the first volume set as the reference volume. Similar to the above-described operation with reference to FIG. 6A, based on the position of the line 622 on the line 624 and the visual object 626, the wearable device 101 may change the second volume based on the first volume, which is the reference volume.

As described above, according to an embodiment, the wearable device 101 may adjust the second volume of the audio signal corresponding to the visual object 290 based on the first volume of the sound of the external object 282 that actually exists. The wearable device 101 may display a UI (e.g., the visual objects 610 and 620) for adjusting the second volume using a display. Based on the UI, the wearable device 101 may visualize that the second volume is adjusted based on the first volume.

Hereinafter, referring to FIGS. 7A, 7B and 7C, according to an embodiment, an example of an operation in which the wearable device 101 adjusts the volume of an audio signal corresponding to visual object 290 based on the movement of at least one of the external object 282 or visual object 290 identified based on the virtual space will be described in greater detail.

Figure 7A:
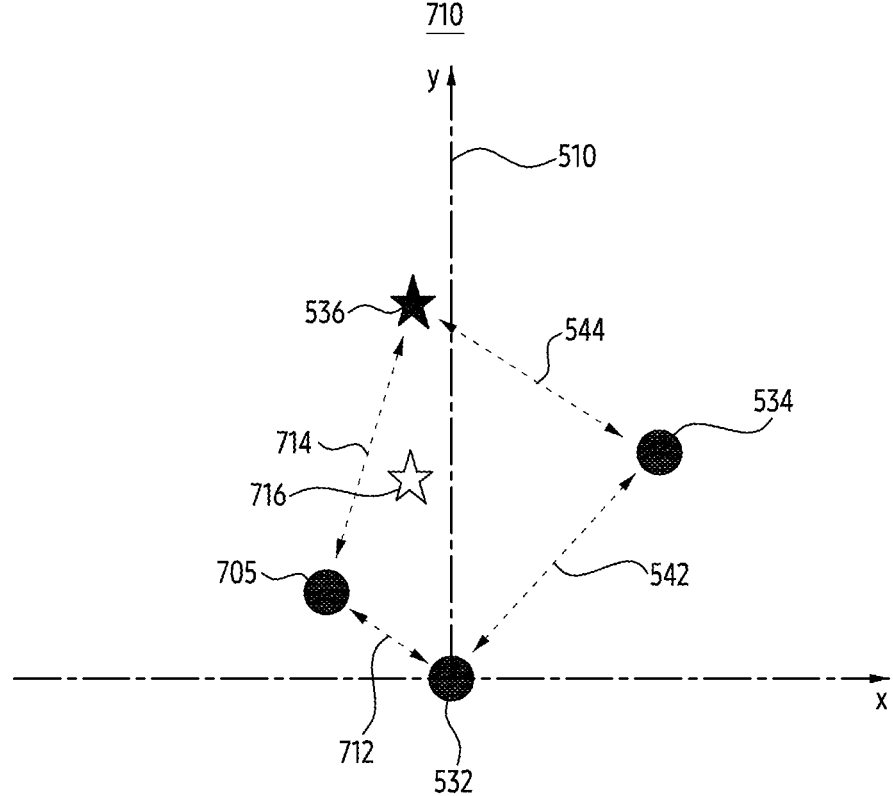
FIGS. 7A, 7B and 7C are diagrams illustrating an example of an operation for adjusting a volume of an audio signal by a wearable device, according to an embodiment.
Figure 7B:
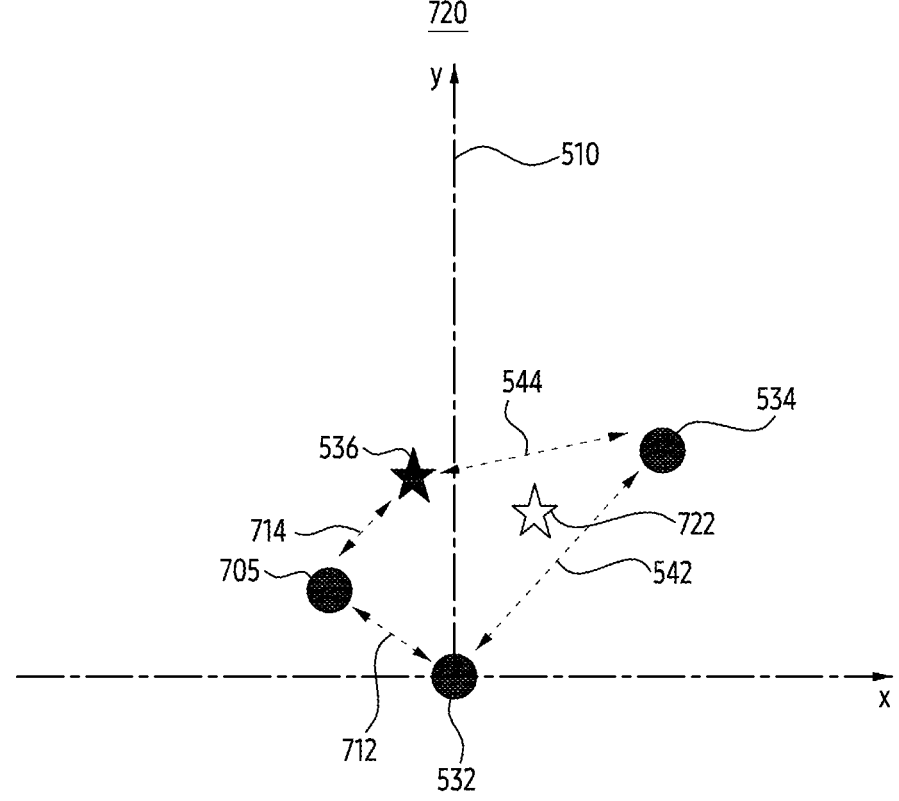
Figure 7C:
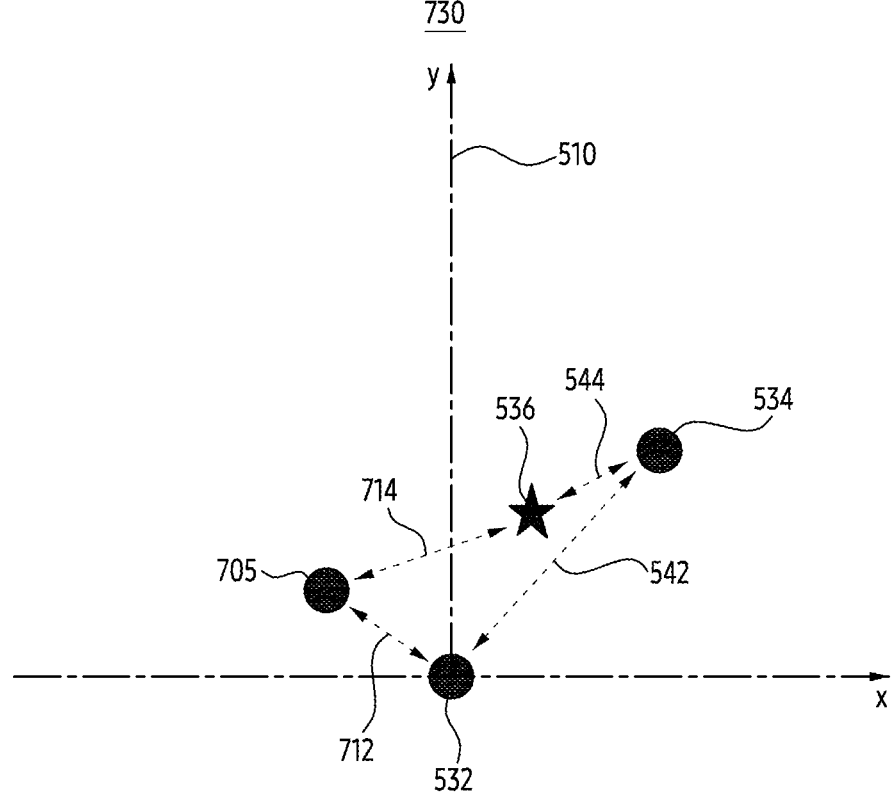

FIGS. 7A, 7B and 7C are diagrams illustrating an example of an operation for adjusting a volume of an audio signal by a wearable device, according to an embodiment. The wearable devices of FIGS. 7A to 7C may include the wearable device 101 of FIGS. 2 to 6. Referring to FIGS. 7A to 7C, according to an embodiment, different states 710, 720, and 730 of the virtual space identified by the wearable device based on the positions of one or more external objects (e.g., the external object 280 of FIG. 2) and the visual object (e.g., the visual object 290 in FIG. 2) displayed through the display (e.g., the display 230 in FIG. 2) are illustrated. The point 532 in the virtual space may indicate the position of the wearable device.

According to an embodiment, the wearable device may identify one or more points in the virtual space for the one or more external objects using a camera (e.g., the camera 240 of FIG. 2) and/or a sensor (e.g., the depth sensor 430 of FIG. 4B). In an embodiment of FIGS. 7A to 7C in which the wearable device identifies two external objects, the points 534 and 705 may represent positions of each of the external objects identified by the wearable device based on the virtual space. The external objects may be viewable to a user wearing the wearable device through a display of the wearable device. For example, the external objects may be included in the user's FoV (e.g., the FoV 270 of FIG. 2). The distance 542 may indicate a distance between the points 532 and 534 (e.g., distance between the wearable device and the first external object corresponding to the point 534). The distance 712 may indicate a distance between the points 705 and 532 (e.g., distance between the wearable device and the second external object corresponding to the point 705).

In an embodiment, the wearable device may identify at least one point in the virtual space for at least one visual object (e.g., the visual object 290 of FIG. 2) displayed in the display. In an embodiment of FIGS. 7A to 7C in which the wearable device displays a visual object within the display, the point 536 may represent the position of the visual object identified by the wearable device based on the virtual space.

As described above with reference to FIGS. 2 to 6, according to an embodiment, the wearable device may obtain a second volume of an audio signal corresponding to the visual object based on the first volume of the sound of the external object that actually exists. The wearable device may obtain the second volume based on a difference between positions of the first volume, the external object in the virtual space, and the visual object. In the state 710 of FIG. 7A in which the wearable device identifies a plurality of external objects, the wearable device may obtain a volume of an audio signal corresponding to the visual object, based on the sound output from the external object closest to the visual object among the plurality of external objects. In the state 710 of FIG. 7A, the wearable device may identify the external object closest to the visual object based on the distances 544 and 714 between the points 534 and 705 indicating the position of each of the external objects and the points 536 indicating the position of the visual object. For example, the wearable device may obtain a second volume of an audio signal corresponding to the visual object based on the first volume of sound output from the first external object corresponding to the point 534. The second volume may be obtained based on the distance 544 between the points 534 and 536 in the virtual space, and the first volume. For example, in the state 710 of FIG. 7A, the wearable device may determine the first volume of the first external object as a reference volume used to adjust the second volume of the visual object, and/or a dominant volume.

According to an embodiment, the wearable device may identify movement of an external object and/or a visual object. The wearable device may identify the movement of the external object using a camera. The wearable device may identify the movement of the visual object based on at least one of the users motion identified by the wearable device or a signal transmitted from an external electronic device indicated by the visual object. The movement of the external object and/or the visual object identified by the wearable device may trigger the movement of at least one point corresponding to the external object and/or the visual object in the virtual space. Referring to FIG. 7A, in the state 710, it is assumed that the wearable device has identified an input for moving a visual object to a point 716 in the virtual space. Referring to FIG. 7B, the state 720 of the virtual space after adjusting the position of the point 536 corresponding to the visual object based on the input is illustrated.

Referring to FIG. 7B, the wearable device may identify the external object closest to the visual object again, based on identifying that the position of the point 736 corresponding to the visual object is adjusted. In the state 720 of FIG. 7B, the wearable device may identify a point 705 closest to the point 536 indicating the position of the visual object from among the points 534 and 705 indicating the position of each of the plurality of external objects. The wearable device may obtain a second volume of the audio signal based on the third volume of the second external object corresponding to the point 705 among the plurality of external objects. The second volume may be obtained based on the distance 714 between the points 536 and 705, and the third volume. As the point 536 corresponding to the visual object moves toward the point 532 corresponding to the wearable device, the second volume of the audio signal in the state 720 may be greater than the second volume of the audio signal in the state 710. In the state 720 of FIG. 7B, unlike the state 710 of FIG. 7A, the wearable device may identify the volume of the acoustic signal output from the second external object as a reference volume used to adjust the second volume of the audio signal. In the state 720 of FIG. 7B, the wearable device may adjust the position of the point 536 corresponding to the visual object based on an input indicating that the visual object is moved to the point 722 in the virtual space.

The state 730 of FIG. 7C may represent a state of the virtual space after the wearable device adjusts the position of the point 536 based on the input. In the state 730, based on the first external object corresponding to the point 534 closest to the point 536 corresponding to the visual object, among the points 534 and 705 representing the positions of the plurality of external objects, the wearable device may adjust the volume of an audio signal corresponding to the visual object. For example, the wearable device may obtain the second volume of the audio signal based on the first volume of sound output from the first external object and the distance 544 between the points 534 and 536 in the virtual space.

Although an operation of adjusting the volume of an audio signal corresponding to the visual object by the wearable device based on the movement of the visual object in the virtual space is described, the embodiment is not limited thereto. For example, based on identifying that at least one of the external objects indicated based on points 534 and 536 is moving, the wearable device may identify a reference volume to be used for adjusting the volume of an audio signal corresponding to the visual object again, similar to the described above with reference to FIGS. 7A to 7C. Although an embodiment in which the wearable device adjusts the volume of the audio signal based on the volume of sound output from a single external object is described, the embodiment is not limited thereto. In the state 730 of FIG. 7C, according to an embodiment, the wearable device may obtain a volume of an audio signal by mixing volumes of sounds of external objects corresponding to the points 534 and 705 based on the distances 714 and 544 formed by the points 536 with each of the points 534 and 705.

As described above, according to an embodiment, in a state of identifying the first external object and the second external object, the wearable device may obtain a first distance (e.g., distance 544) between the first external object and the visual object, and a second distance (e.g., distance 714) between the second external object and the visual object. Based on obtaining the first distance less than the second distance, the wearable device may obtain the second volume of the audio signal based on the first volume of sound output from the first external object. In a state of obtaining the second volume based on the first volume, based on identifying the second distance reduced to less than the first distance based on the movement of at least one of the first external object, the second external object, or the visual object, the wearable device may obtain a second volume based on a third volume of another sound output from the second external object. Since the wearable device obtains the volume of the audio signal based on the volumes of sounds output from external objects and the positions of the external objects in the virtual space, the wearable device may reduce a sense of heterogeneity generated while reproducing the audio signal together with the sounds.

According to an embodiment, the wearable device may display a visual object for controlling an external electronic device. Based on the positions of the external electronic device and visual object shown through FoV, the wearable device may control the external electronic device or adjust the volume of the audio signal corresponding to the visual object. Hereinafter, referring to FIG. 8, according to an embodiment, an example of an operation performed by a wearable device based on a visual object for controlling an external electronic device will be described.

Figure 8:
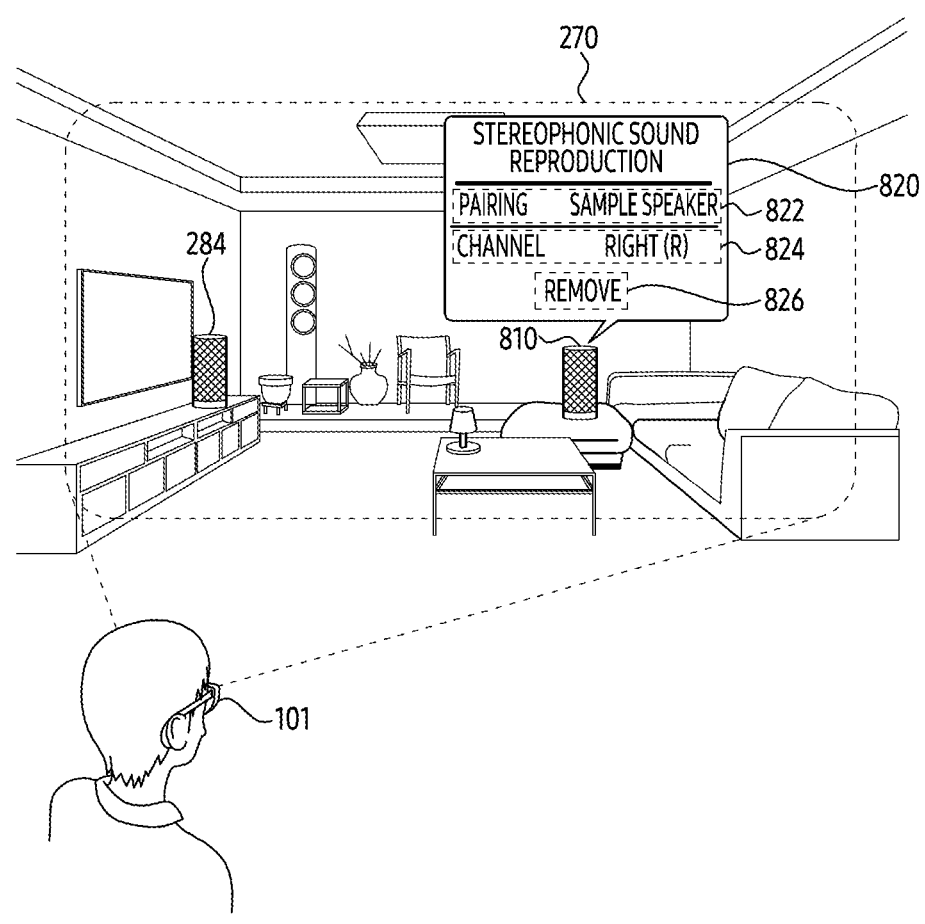
FIG. 8 is a diagram illustrating an example of an operation in which a wearable device displays a visual object in association with an external electronic device, according to an embodiment.

FIG. 8 is a diagram illustrating an example of an operation in which a wearable device 101 displays a visual object 810 in association with an external electronic device, according to an embodiment. The wearable device 101 of FIG. 8 may include the wearable device of FIGS. 2 to 6, and/or 7A to 7C. For example, the wearable device 101 and FoV 270 of FIG. 2 may correspond to the wearable device 101 and FoV 270 of FIG. 8.

According to an embodiment, the wearable device 101 may establish a communication link for receiving an audio signal from the external object 284 using the external object 284 that is an external electronic device, and a communication circuit (e.g., the communication circuit 250 of FIG. 2). A communication link between the wearable device 101 and the external object 284 may be established based on a process (e.g., pairing) by a communication protocol. The wearable device 101 may identify that the external object 284 is a speaker for reproducing an audio signal through a communication link.

Referring to FIG. 8, according to an embodiment, the wearable device 101 may identify an input indicating that the visual object 810 related to the external object 284 is generated within a state that the external object 284 is displayed in the FoV 270. The input may be identified based on a gesture of a user wearing the wearable device 101. For example, the user may tap the wearable device 101 according to a specified number of times while gazing at the external object 284. In the example, based on a gesture of tapping the wearable device 101 and a user's gaze detected while the gesture is performed, the wearable device 101 may identify the input. The embodiment is not limited thereto. For example, the wearable device 101 may receive the input based on a gesture dragging the external object 284.

Referring to FIG. 8, an example of a state in which the wearable device 101 displays a visual object 810 related to the external object 284 in a display (e.g., the display 230 of FIG. 2) based on the input is illustrated. According to an embodiment, in the state in which the visual object 810 related to the external object 284 for reproducing the audio signal is displayed, the wearable device 101 may output at least a part of the audio signal through a speaker (e.g., the speaker 210 of FIG. 2) of the wearable device 101, based on a position of the visual object 810 and positions of the external object 284. Identifying the position of the visual object 810 and the position of the external object 284 by the wearable device 101 may be performed similar to the described above with reference to FIGS. 5A to 5B, and/or 7A to 7C.

According to an embodiment, the wearable device 101 may perform at least one of reproducing an audio signal received from the external object 284 based on the visual object 810 or controlling an audio signal reproduced by the external object 284. For example, the wearable device 101 may request the external object 284 to transmit an audio signal corresponding to the visual object 810. The wearable device 101 may output an audio signal received from the external object 284 based on the position of the external object 284 and the position of the visual object 810. For example, the volume of the audio signal output by the wearable device 101 may be adjusted based on at least one of the volume of sound output from the external object 284, the position of the external object 284, or the position of the visual object 810. For example, adjusting the volume of the audio signal output by the wearable device 101 may be performed similar to the described above with reference to FIGS. 5A to 5B and/or 7A to 7C.

According to an embodiment, the wearable device 101 may control reproduction of an audio signal by the wearable device 101 and/or the external object 284 based on a multi-channel such as a stereo. For example, the wearable device 101 may request the external object 284 to transmit an audio signal of a specific channel. The specific channel may be related to the position relationship of the external object 284 and the visual object 810 in the FoV 270 of the wearable device 101. In the FoV 270, in an example case of FIG. 8 where the visual object 810 is shown positioned to the right of external object 284, the wearable device 101 may request the external object 284 to transmit an audio signal of the right channel Based on the request, the external object 284 may transmit an audio signal of the right channel to the wearable device 101. Based on the request, the external object 284 may reproduce an audio signal of the left channel. In the example case of FIG. 8, the external object 284 may reproduce an audio signal of a left channel, and the wearable device 101 may reproduce an audio signal of a right channel, thereby providing a user experience based on stereophonic sound.

Referring to FIG. 8, according to an embodiment, the wearable device 101 may display the visual object 820 for controlling reproduction of an audio signal related to the visual object 810. The visual object 820 may include a pop-up window for controlling reproduction of an audio signal. In the visual object 820, the wearable device 101 may display the visual object 822 including text indicating the external object 284 related to the visual object 810. Referring to FIG. 8, the wearable device 101 may display the visual object 822 including a name (e.g., "sample speaker") assigned to the external object 284. In the visual object 820, the wearable device 101 may display the visual object 824 including text indicating a channel of an audio signal output from the wearable device 101 based on the visual object 810. In the example case of FIG. 8, the wearable device 101 may display the visual object 824 including a designated text (e.g., "right (R)") indicating that an audio signal of a right channel is reproduced. Based on an input related to the visual object 824, the wearable device 101 may receive an input indicating that the channel of the audio signal output from wearable device 101 is selected and/or adjusted. In the visual object 820, the wearable device 101 may display the visual object 826 such as a button (e.g., a button including designated text such as "remove") for ceasing display of the visual object 810. In response to an input indicating that the visual object 826 is selected, the wearable device 101 may at least temporarily cease displaying the visual object 810. Based on the input related to the visual object 826, the wearable device 101 may release a communication link between the external object 284 and the wearable device 101. In response to the input to the visual object 826, the wearable device 101 may at least temporarily cease reproducing an audio signal related to the visual object 810.

As described above, according to an embodiment, the wearable device 101 may request an audio signal related to sound output from the external object 284 to the external object 284 through a communication circuit, based on the position relationship between the external object 284 shown through the display and the visual object 810 displayed within the display. The wearable device 101 may output the audio signal through a speaker, based on receiving the audio signal as a response to the request through the communication circuit. The wearable device 101 may request an audio signal of a first channel (in an embodiment of FIG. 8, a right channel) identified based on the position relationship among a plurality of channels of sound output from the external object to the external object 284 through a communication circuit. The request to the external object 284 may indicate that at least temporarily cease playing of the first channel among the plurality of channels. In this case, the wearable device 101 may support reproduction of a stereophonic audio signal based on the speaker of the wearable device 101 and the external object 284.

Hereinafter, referring to FIGS. 9, 10, 11 and 12, an example of an operation of the wearable device 101 described above with reference to FIGS. 2 to 8 will be described in greater detail.

Figure 9:
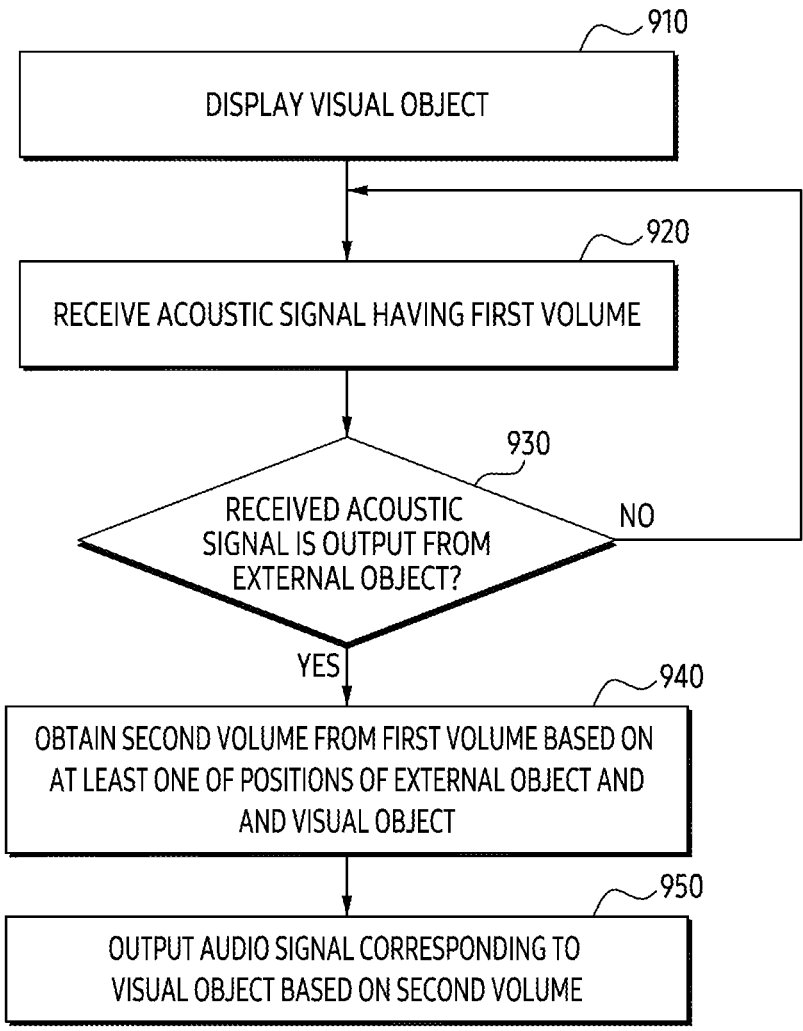
FIG. 9 is a flowchart illustrating an example operation of a wearable device, according to an embodiment.

FIG. 9 is a flowchart illustrating an example operation of a wearable device, according to an embodiment. The wearable device of FIG. 9 may include the wearable device 101 of FIGS. 2 to 8. For example, the operations of FIG. 9 may be performed by the wearable device 101 and/or the processor 120 of FIG. 2.

Referring to FIG. 9, in operation 910, the wearable device according to an embodiment may display a visual object. The visual object may include the visual object 290 of FIG. 2 and/or the visual object 810 of FIG. 8. The wearable device may display a visual object using the display 230 of FIG. 2. Performing operation 910 by the wearable device may be performed in a state in which one or more external objects (e.g., the external object 280 in FIG. 2) included in the external space of the wearable device are identified using a camera (e.g., the camera 240 in FIG. 2).

Referring to FIG. 9, according to an embodiment, in operation 920, the wearable device may receive an acoustic signal having a first volume. For example, the wearable device may receive the acoustic signal using the microphone 220 of FIG. 2.

According to an embodiment, based on receiving the acoustic signal, in operation 930, the wearable device may determine whether the received acoustic signal is output from an external object. The wearable device may determine whether the acoustic signal is output from the external object by comparing a direction of the acoustic signal received based on operation 920 and the position of the external object identified using the camera. For example, the wearable device may identify a first direction of the acoustic signal for the wearable device in response to receiving the acoustic signal of operation 920. The wearable device may identify a second direction of the external object based on the image obtained from the camera. The wearable device may identify whether the acoustic signal is output from the external object based on the first direction and the second direction. In an embodiment, the wearable device may identify whether the acoustic signal is output from the external object based on the category in which the external objects identified based on the image are classified. For example, based on whether the external object is suitable for outputting the acoustic signal of operation 920, the wearable device may identify whether the acoustic signal is output from the external object. When the acoustic signal is not output from the external object (930—NO), the wearable device may receive the acoustic signal based on operation 920.

According to an embodiment, when the acoustic signal of operation 920 is output from an external object (930—YES), the wearable device may obtain the second volume from the first volume of operation 920 based on at least one of the positions of the external object and the visual object in operation 940. For example, the wearable device may obtain the second volume based on at least one of a first direction of an acoustic signal, a second direction of an external object, or the position relationship. The positions of the external object and the visual object may include positions within the virtual space identified by the wearable device. The wearable device may identify a difference between the position of the external object and the position of the visual object within the virtual space. Based on the difference, the wearable device may obtain a second volume by adjusting the first volume of the acoustic signal.

Referring to FIG. 9, in operation 950, according to an embodiment, the wearable device may output an audio signal corresponding to the visual object based on the second volume. The wearable device may output an audio signal using a speaker (e.g., the speaker 210 of FIG. 2). As shown in the visual objects 610 and 620 of FIG. 6, the wearable device may display a UI for adjusting the second volume of operation 950 to the user. Since the audio signal is output based on the second volume adjusted from the first volume of the acoustic signal, the wearable device may reduce a sense of heterogeneity based on a sharp difference between the first volume and the second volume. In an embodiment, when the wearable device includes two speakers corresponding to each of the user's two ears, the wearable device may adjust the azimuth angle of the audio signal based on the phase difference of the audio signal output from each of the speakers.

Figure 10:
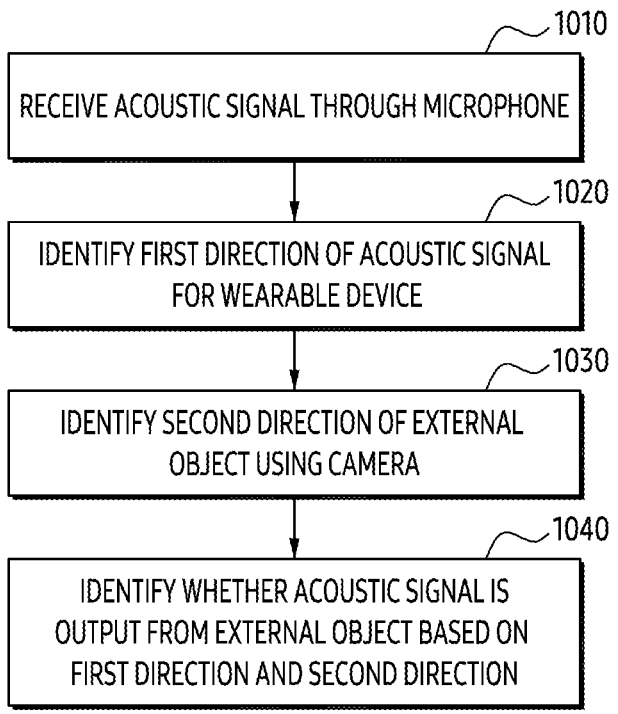
FIG. 10 is a flowchart illustrating an example operation performed by a wearable device based on reception of an acoustic signal, according to an embodiment.

FIG. 10 is a flowchart illustrating an example operation performed by a wearable device based on reception of an acoustic signal, according to an embodiment. The wearable device of FIG. 10 may include the wearable device 101 of FIGS. 2 to 8. The operations of FIG. 10 may be performed by the wearable device 101 and/or the processor 120 of FIG. 2. The operations of FIG. 10 may be related to the operations 920, 930, and 940. However, the embodiment is not limited thereto.

Referring to FIG. 10, according to an embodiment, in operation 1010, the wearable device may receive an acoustic signal through a microphone (e.g., the camera 240 of FIG. 2). The operation 1010 of FIG. 10 may be performed similar to the operation 920 of FIG. 9. For example, the wearable device may receive an acoustic signal based on operation 1010 in a state of displaying the visual object of operation 910.

Referring to FIG. 10, in operation 1020, according to an embodiment, the wearable device may identify the first direction of the acoustic signal for the wearable device. The first direction may include an azimuth angle of the sound signal. In an embodiment where the wearable device includes at least two microphones spaced apart from each other, the wearable device may identify the first direction based on a difference between volumes of acoustic signals received through each of the microphones and/or phases.

Referring to FIG. 10, in operation 1030, according to an embodiment, the wearable device may identify the second direction of the external object using a camera (e.g., the camera 240 of FIG. 2). For example, the wearable device may obtain an image including at least a part of the FoV (e.g., the FoV 270 of FIG. 2) shown through the display (e.g., the display 230 of FIG. 2) of the wearable device using the camera. According to an embodiment, the wearable device may identify an external object from the image by processing the image based on object recognition. The wearable device may identify the second direction based on the position and/or size of the external object in the image.

Referring to FIG. 10, in operation 1040, according to an embodiment, the wearable device may identify whether an acoustic signal is output from an external object based on the first direction and the second direction. For example, in at least a part of the image overlapping the first direction in which the acoustic signal is output, the wearable device may determine that the acoustic signal is output from the external object, in response to identifying the external object. For example, when a difference between the first direction and the second direction is less than a designated threshold, the wearable device may determine that the acoustic signal is output from the external object. In a state in which the acoustic signal is output from the external object based on operation 1040, the wearable device may adjust the volume of the audio signal corresponding to the visual object displayed in the display based on the volume of the acoustic signal. For example, the wearable device may perform at least one of operations 940 and 950 of FIG. 9, in the state.

Figure 11:
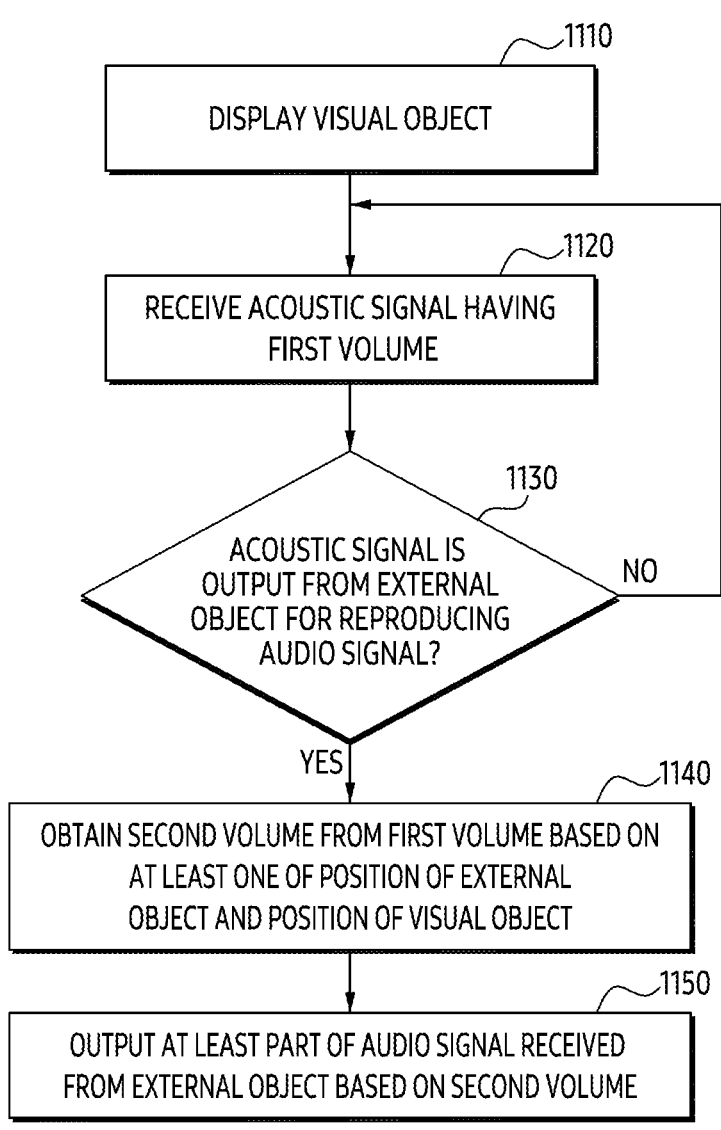
FIG. 11 is a flowchart illustrating an example operation of a wearable device, according to an embodiment.

FIG. 11 is a flowchart illustrating an example operation of a wearable device, according to an embodiment. The wearable device of FIG. 11 may include the wearable devices of FIGS. 2 to 10. The operations of FIG. 11 may be performed by the wearable device 101 and/or the processor 120 of FIG. 2. The operations of FIG. 11 may be related to at least one of the operations of FIGS. 9 to 10.

Referring to FIG. 11, in operation 1110, according to an embodiment, the wearable device may display a visual object. The wearable device may display a visual object (e.g., the visual object 290 of FIG. 2 and/or the visual object 810 of FIG. 8) in association with an external object (e.g., the external object 280) shown through the display (e.g., the display 230 in FIG. 2) of the wearable device. In an embodiment, operation 1110 may be performed based on an input related to an external object shown through a display, similar to the described above with reference to FIG. 8.

Referring to FIG. 11, in operation 1120, according to an embodiment, the wearable device may receive an acoustic signal having a first volume. While displaying the visual object based on operation 1110, the wearable device may receive an acoustic signal having the first volume through a microphone (e.g., the microphone 220 of FIG. 2). Performing operation 1120 by the wearable device may be performed similar to operation 920 of FIG. 9 and/or operations 1010 and 1020.

Referring to FIG. 11, in operation 1130, according to an embodiment, the wearable device may determine whether the acoustic signal is output from an external object for reproducing an audio signal. In response to receiving the acoustic signal of operation 1120, the wearable device may identify whether the acoustic signal is output from an external object (e.g., the external object 284 of FIG. 2 and/or FIG. 8) for reproducing an audio signal. Performing operation 1130 by the wearable device may be performed similar to operations of FIG. 10 and/or the operation 930 of FIG. 9. For example, based on at least one of the difference between the direction of the acoustic signal and the direction of the external object or the types of the external object, the wearable device may determine whether the acoustic signal is output from the external object. When the acoustic signal is not output from the external object (1130—NO), the wearable device may maintain receiving the acoustic signal based on operation 1120.

In a case that the acoustic signal is output from the external object (1130—YES), in operation 1140, according to an embodiment, the wearable device may obtain a second volume from the first volume based on at least one of the position of the external object and the position of the visual object. Based on identifying that the acoustic signal is output from the external object, the wearable device may obtain a second volume corresponding to the visual object, by adjusting the first volume based on a positional relationship between the external object and the visual object. Performing operation 1140 by the wearable device may be performed similar to operation 940 of FIG. 9.

Referring to FIG. 11, in operation 1150, according to an embodiment, the wearable device may output at least a part of the audio signal received from the external object based on the second volume. Based on the second volume of operation 1140, the wearable device may output at least a part of an audio signal received from an external object through a communication circuit (e.g., the communication circuit 250 of FIG. 2) through a speaker (e.g., the speaker 210 of FIG. 2). When the external object reproduces the audio signal based on a plurality of channels, based on operation 1150, in a state in which the audio signal is output based on the first channel among the plurality of channels, the wearable device may transmit a signal indicating that reproducing of the audio signal based on the first channel is at least temporarily stopped and that reproducing of the audio signal based on other channels different from the first channel is maintained to an external object using a communication circuit. As shown in the visual object 820 of FIG. 8, the wearable device may display a UI for adjusting the second volume of operation 1150 to the user.

Figure 12:
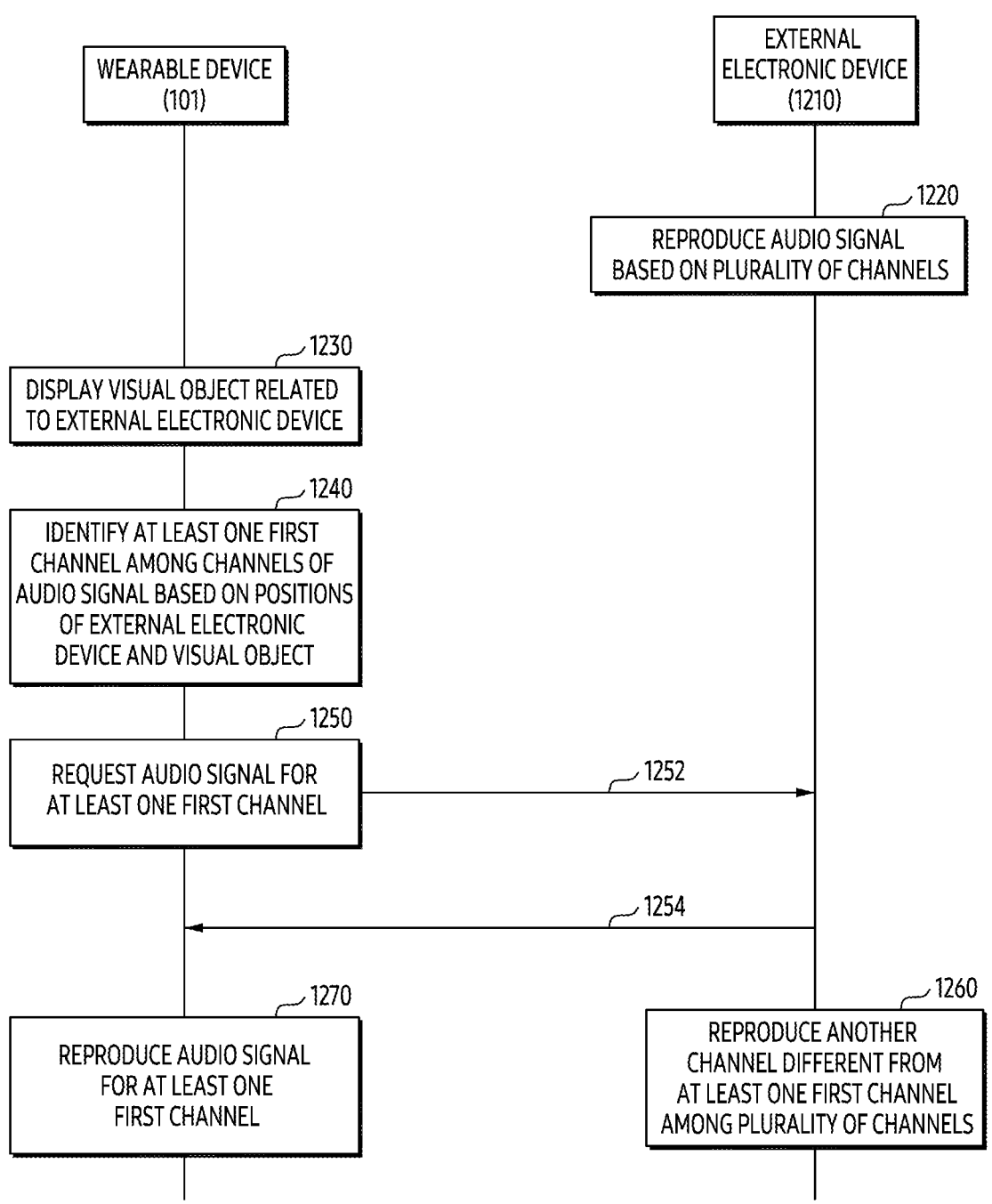
FIG. 12 is a signal flow diagram illustrating an example operation of a wearable device and an external electronic device, according to an embodiment.

FIG. 12 is a signal flow diagram illustrating an example operation of a wearable device 101 and an external electronic device 1210, according to an embodiment. The wearable device 101 of FIG. 12 may include the wearable device of FIGS. 2 to 11. The operation of the wearable device 101 of FIG. 12 may be related to at least one of the operations of FIG. 11. The operation of the wearable device 101 of FIG. 12 may be performed by the wearable device 101 and/or the processor 120 of FIG. 2. The external electronic device 1210 of FIG. 12 may include an external electronic device capable of establishing a communication link with the wearable device 101, such as the external object 284 of FIG. 2 and/or FIG. 8.

Referring to FIG. 12, in operation 1220, according to an embodiment, the external electronic device 1210 may reproduce an audio signal based on a plurality of channels. The external electronic device 1210 may be disposed in the external space of the wearable device 101 that may be recognized by the wearable device 101.

Referring to FIG. 12, in operation 1230, according to an embodiment, the wearable device 101 may display a visual object (e.g., the visual object 810 of FIG. 8) related to the external electronic device 1210. As described above with reference to FIG. 8, the wearable device 101 may display a visual object in response to an input indicating that a visual object related to the external electronic device 1210 is inserted. In an embodiment, the wearable device 101 may obtain a volume of an audio signal corresponding to a visual object based on the volume of external electronic device 1210 by performing at least one of the operations of FIGS. 9 to 11.

Referring to FIG. 12, in operation 1240, according to an embodiment, the wearable device 101 may identify at least one first channel among channels of an audio signal based on positions of the external electronic device 1210 and the visual object. The at least one first channel may be adjusted based on the position relationship between the external electronic device 1210 shown through the FoV and the visual object. The at least one first channel may be identified from among channels of the audio signal within the virtual space of wearable device 101, based on at least one of the positions of the wearable device 101, the external electronic device 1210, and the visual object. The number of channels of the audio signal may be related to the type of stereophonic sound (e.g., stereo, and/or more than two multi-channel stereophonic sound) supported by the audio signal.

Referring to FIG. 12, in operation 1250, according to an embodiment, the wearable device 101 may request an audio signal for at least one first channel. The wearable device 101 may transmit a signal 1252 indicating that an audio signal for the at least one first channel is requested to the external electronic device 1210. Based on receiving the signal 1252, the external electronic device 1210 may transmit an audio signal 1254 related to the at least one first channel to the wearable device 101. In operation 1260, according to an embodiment, the external electronic device 1210 may reproduce another channel different from at least one first channel among a plurality of channels, while transmitting the audio signal 1254 to the wearable device 101. The external electronic device 1210 may at least temporarily cease reproducing the at least one first channel based on operation 1260.

Based on receiving the audio signal 1254, in operation 1270, according to an embodiment, the wearable device 101 may reproduce an audio signal for at least one first channel. The wearable device 101 may reproduce the audio signal 1254 received from the external electronic device 1210 using a speaker (e.g., the speaker 210 of FIG. 2). The wearable device 101 reproduces the audio signal 1254 may be performed based on at least one of the positions between the visual object, the wearable device 101, and the external electronic device 1210, which the wearable device 101 identified based on the virtual space. Reproducing the audio signal 1254 by the wearable device 101 may be performed, based on at least one of the positions between the visual object, the wearable device 101, and the external electronic device 1210 identified by the wearable device 101 based on the virtual space. For example, as the wearable device 101 adjusts the volume of the external electronic device 1210, the volume of the audio signal 1254 in operation 1270 may be obtained based on the difference between the external electronic device 1210 and the positions of the visual object.

As described above, according to an embodiment, the wearable device 101 may adjust the volume of the audio signal output through the speaker of the wearable device 101 based on the sound generated from the actual external object. The volume may be adjusted based on the volume of the sound. The wearable device 101 may adjust the volume of the audio signal by comparing the position of the visual object related to the audio signal and the position of the external object.

While reproducing an audio signal using a wearable device, a method of adjusting the volume of the audio signal based on the volume of sound generated around the wearable device may be required.

As described above, according to an example embodiment, a wearable device (e.g., the wearable device 101 of FIG. 2) may comprise: a speaker (e.g., the speaker 210 in FIG. 2), a microphone (e.g., the microphone 220 in FIG. 2), a display (e.g., the display 230 in FIG. 2), a camera (e.g., the camera 240 in FIG. 2), and a processor (e.g., the processor 120 in FIG. 2). The display may be configured to allow at least a portion of light incident on a first surface of the display to penetrate through a second surface opposite to the first surface. The camera may be configured to capture an image. The processor may be configured to display a visual object (e.g., the visual object 290 of FIG. 2 and/or the visual object 810 of FIG. 8) in association with an external object (e.g., the external object 280 of FIG. 2) viewable through the display. The processor may be configured to receive an acoustic signal through the microphone while displaying the visual object. The processor may be configured to identify, at least based on the image obtained by the camera in response to receiving the acoustic signal having a first volume, whether the acoustic signal is output from the external object. The processor may be configured to obtain, based on identifying that the acoustic signal is output from the external object, a second volume corresponding to the visual object by adjusting the first volume based on a position relationship between the external object, and the visual object. The processor may be configured to output an audio signal corresponding to the visual object through the speaker based on the obtained second volume.

For example, the processor may be configured to identify, in response to receiving the acoustic signal, a first direction of the acoustic signal regarding the wearable device. The processor may be configured to identify a second direction of the external object based on the image. The processor may be configured to identify, based on the first direction and the second direction, whether the acoustic signal is output from the external object.

For example, the processor may be configured to identify, based on a category to which the external object identified based on the image is classified, whether the acoustic signal is output from the external object.

For example, the processor may be configured to control the wearable device to output, based on at least one of the second direction of the external object or the position relationship, the audio signal having the second volume.

For example, the processor may be configured to obtain, in a state of identifying a first external object that is the external object, and a second external object different from the first external object using the camera, a first distance between the first external object and the visual object, and a second distance between the second external object and the visual object. The processor may be configured to obtain, based on the obtaining of the first distance less than the second distance, the second volume based on the first volume of the acoustic signal output from the first external object.

For example, the processor may be configured to obtain, based on identifying the second distance reduced to be less than the first distance based on movement of at least one of the first external object, the second external object or the visual object, the second volume based on a third volume of another acoustic signal output from the second external object.

For example, the wearable device may further comprise a communication circuit (e.g., the communication circuit 250 in FIG. 2) configured to communicate with the external object outputting the acoustic signal. The processor may be configured to control the display to display, in response to an input indicating insertion of the visual object based on the external object, the visual object in the display.

For example, the processor may be configured to request, to the external object through the communication circuit based on the position relationship between the external object viewable through the display, and the visual object displayed in the display, the audio signal associated with the acoustic signal output from the external object. The processor may be configured to output, based on receiving the audio signal as a response to the request through the communication circuit, the audio signal through the speaker.

For example, the processor may be configured to request, to the external object through the communication circuit, the audio signal of a first channel identified based on the position relationship, among a plurality of channels included in the acoustic signal output from the external object.

For example, the processor may be configured to request, to the external object, at least temporary cessation of reproducing of the first channel among the plurality of channels.

As described above, according to an example embodiment, a method of operating a wearable device may comprise displaying (e.g., the operation 1110 in FIG. 11) a visual object in association with an external object viewable through a display of the wearable device. The method may include receiving (e.g., the operation 1120 in FIG. 11) an acoustic signal having a first volume through a microphone of the wearable device while displaying the visual object. The method may include identifying (e.g., the operation 1130 in FIG. 11), in response to the receiving of the acoustic signal, whether the acoustic signal is output from the external object for reproducing an audio signal. The method may include obtaining (e.g., the operation 1140 in FIG. 11), based on identifying that the acoustic signal is output from the external object, a second volume corresponding to the visual object by adjusting the first volume based on a position relationship between the external object and the visual object. The method may include outputting (e.g., the operation 1150 in FIG. 11), based on the obtained second volume, at least portion of the audio signal received from the external object through a communication circuitry of the wearable device, through a speaker of the wearable device.

For example, the identifying may comprise obtaining, using a camera of the wearable device, an image including at least portion of a field-of-view (FoV), viewable through the display. The identifying may comprise identifying, in response to identifying the external object in at least portion of the image overlapped to a direction where the acoustic signal is output.

For example, the obtaining the second volume may comprise adjusting, based on a difference between a first position of the external object mapped to a virtual space and a second position of the visual object mapped to the virtual space, the first volume.

For example, the displaying the visual object may comprise displaying, in response to an input associated with the external object viewable through the display, the visual object.

For example, the outputting may comprise transmitting, to the external object in a state of outputting the audio signal through the speaker based on a first channel among a plurality of channels, a signal indicating that reproduction of the audio signal based on the first channel is at least temporarily ceased, and reproduction of the audio signal based on another channel different from the first channel is maintained.

As described above, according to an example embodiment, a method of operating a wearable device may comprise displaying (e.g., the operation 910 in FIG. 9) a visual object in association with an external object viewable through a display of the wearable device. The method may include receiving (e.g., the operation 920 in FIG. 9) an acoustic signal through a microphone of the wearable device while displaying the visual object. The method may include identifying (e.g., the operation 930 in FIG. 9), in response to receiving the acoustic signal having a first volume, whether the acoustic signal is output from the external object at least based on an image obtained by a camera of the wearable device. The method may include obtaining (e.g., the operation 940 in FIG. 9), based on identifying that the acoustic signal is output from the external object, a second volume corresponding to the visual object by adjusting the first volume based on position relationship between the external object and the visual object. The method may include outputting (e.g., the operation 950 in FIG. 9), an audio signal corresponding to the visual object through a speaker of the wearable device based on the obtained second volume.

For example, the identifying may comprise identifying (e.g., the operation 1020 in FIG. 10), in response to receiving the acoustic signal, a first direction of the acoustic signal regarding the wearable device. The identifying may comprise identifying (e.g., the operation 1030 in FIG. 10), based on the image, a second direction of the external object. The identifying may comprise identifying (e.g., the operation 1040 in FIG. 10), based on the first direction and the second direction, whether the acoustic signal is output from the external object.

For example, the identifying may comprise identifying, based on a category to which the external object is classified based on the image, whether the acoustic signal is output from the external object.

For example, the outputting may comprise outputting, based on at least one of the second direction of the external object or the position relationship, the audio signal having the second volume.

For example, the obtaining may comprise obtaining, in a state of identifying a first external object that is the external object, and a second external object different from the first external object using the camera, a first distance between the first external object and the visual object, and a second distance between the second external object and the visual object. The obtaining may comprise obtaining, based on the obtaining of the first distance lower than the second distance, the second volume based on the first volume of the acoustic signal output from the first external object.

For example, the displaying may comprise displaying, in response to an input indicating insertion of the visual object based on the external object, the visual object in the display.

For example, the outputting may comprise requesting, to the external object through the communication circuit based on the position relationship between the external object viewable through the display and the visual object displayed in the display, the audio signal associated with the acoustic signal output from the external object. The outputting may comprise outputting, based on receiving the audio signal as a response to the request through the communication circuit, the audio signal through the speaker.

For example, the requesting may comprise outputting, to the external object through the communication circuit, the audio signal of a first channel that is identified based on the position relationship, among a plurality of channels included in the acoustic signal output from the external object.

For example, the requesting may comprise requesting, to the external object, at least temporary cessation of reproducing of the first channel among the plurality of channels.

As described above, according to an example embodiment, a wearable device (e.g., the wearable device 101 of FIG. 2) may comprise: a communication circuit (e.g., the communication circuit 250 of FIG. 2), a speaker (e.g., the speaker 210 in FIG. 2), a microphone (e.g., the microphone 220 in FIG. 2), a display (e.g., the display 230 in FIG. 2), a camera (e.g., the camera 240 in FIG. 2), and a processor (e.g., the processor 120 of FIG. 2). The display may be configured to allow at least a portion of light incident on a first surface of the display to penetrate through a second surface opposite to the first surface. The camera may be configured to capture an image. The processor may be configured to display a visual object (e.g., the visual object 810 in FIG. 8) in association with an external object (e.g., the external object 284 in FIG. 2) viewable through the display. The processor may be configured to receive, while displaying the visual object, an acoustic signal having a first volume through the microphone. The processor may be configured to identify, in response to receiving the acoustic signal, whether the acoustic signal is output from the external object for reproducing an audio signal. The processor may be configured to obtain, based on identifying that the acoustic signal is output from the external object, a second volume corresponding to the visual object by adjusting the first volume based on a position relationship between the external object and the visual object. The processor may be configured to output, based on the obtained second volume, at least portion of the audio signal received from the external object through the communication circuit.

For example, the processor may be configured to obtain, using the camera, an image including at least portion of a field-of-view (FoV), viewable through the display. The processor may be configured to identifying, in response to identifying the external object in at least portion of the image overlapped to a direction where the acoustic signal is output, that the acoustic signal is output from the external object.

For example, the processor may be configured to adjust a first volume based on a difference between a first position of the external object mapped to a virtual space and a second position of the visual object mapped to the virtual space.

For example, the processor may be configured to control the display to display the visual object in response to an input associated with the external object viewable through the display.

For example, the processor may be configured to transmit, to the external object in a state outputting the audio signal through the speaker based on a first channel among a plurality of channels, a signal indicating that reproduction of the audio signal based on the first channel is at least temporarily ceased, and reproduction of the audio signal based on another channel different from the first channel is maintained.

The apparatus described above may be implemented as a combination of hardware components, software components, and/or hardware components and software components. For example, the devices and components described in the various example embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner Software and data may be stored in one or more computer-readable recording media.

The method according to the embodiment may be implemented in the form of program instructions that may be performed through various computer means and recorded in a non-transitory computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although various embodiments have been illustrated and described according to various example embodiments and drawings as above, various modifications and alternatives are possible from the above description. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the disclosure, including the appended claims and their equivalents. It will also be understood that any of the embodiment(s) described herein may be used in conjunction with any other embodiment(s) described herein.

What is claimed is:

1. A head-wearable electronic device, comprising:
at least one speaker;
at least one microphone;
at least one display, when the head-wearable electronic device is worn by a user, positioned toward an eye of the user;
at least one camera; and
at least one processor comprising processing circuitry; and
memory, comprising one or more storage mediums, storing instructions,
wherein the instructions, when executed by the at least one processor individually or collectively, cause the head-wearable electronic device to:
control the at least one display to display a screen using images representing a field-of-view (FOV) of the at least one camera;
control the at least one display to display, within the screen, a virtual object to be seen as being positioned within the FOV of the at least one camera;
receive an acoustic signal through the at least one microphone;
based on receiving the acoustic signal with a first volume while the virtual object is displayed, identify whether the acoustic signal is generated by an external object based on recognizing at least one image received via the at least one camera;
based on identifying that the acoustic signal is generated by the external object, identify a second volume by adjusting the first volume using position relationship between the external object and the virtual object; and
based on identifying an audio signal associated with the virtual object, control the at least one speaker to output the audio signal with the second volume.

2. The head-wearable electronic device of claim 1, wherein the instructions, when executed by the at least one processor individually or collectively, cause the head-wearable electronic device to:
identify, in response to receiving the acoustic signal, a first direction of the acoustic signal regarding the head-wearable electronic device;
identify a second direction of the external object based on the image; and
identify, based on the first direction and the second direction, whether the acoustic signal is output from the external object.

3. The head-wearable electronic device of claim 1, wherein the instructions, when executed by the at least one processor individually or collectively, cause the head-wearable electronic device wearable device to:

identify, based on a category to which the external object is classified, whether the acoustic signal is output from the external object.

4. The head-wearable electronic device of claim 3, wherein the instructions, when executed by the at least one processor individually or collectively, cause the head-wearable electronic device wearable device to:

identify a first direction of the acoustic signal with respect to the head-wearable electronic device;

identify a second direction of the external object with respect to the head-wearable electronic device; and determine whether the acoustic signal is output from the external object based on a difference between the first direction and the second direction.

5. The head-wearable electronic device of claim 1, wherein the instructions, when executed by the at least one processor individually or collectively, cause the head-wearable electronic device to:

obtain, in a state of identifying a first external object that is the external object, and a second external object different from the first external object using the at least one image received via the at least one camera, a first distance between the first external object and the virtual object, and a second distance between the second external object and the virtual object; and obtain, based on the first distance being less than the second distance, the second volume based on the first volume of the acoustic signal output from the first external object.

6. The head-wearable electronic device of claim 5, wherein the instructions, when executed by the at least one processor individually or collectively, cause the head-wearable electronic device wearable device to:

obtain, based on identifying the second distance reduced to be less than the first distance based on movement of at least one of the first external object, the second external object or the virtual object, the second volume based on a third volume of another acoustic signal output from the second external object.

7. The head-wearable electronic device of claim 1, further comprises a communication circuitry configured to communicate with the external object outputting the acoustic signal, and wherein the instructions, when executed by the at least one processor individually or collectively, cause the head-wearable electronic device to:

control the at least one display to display, in response to an input indicating insertion of the virtual object based on the external object, the virtual object within the screen.

8. The head-wearable electronic device of claim 7, wherein the instructions, when executed by the at least one processor individually or collectively, cause the head-wearable electronic device to:

request, to the external object through the communication circuitry, another audio signal associated with the acoustic signal output from the external object; and output, based on receiving the another audio signal as a response to the request through the communication circuitry, the another audio signal through the speaker.

9. The head-wearable electronic device of claim 7, wherein the instructions, when executed by the at least one processor individually or collectively, cause the head-wearable electronic device to:

request, to the external object through the communication circuitry, the audio signal of a first channel identified based on the position relationship, among a plurality of channels included in the acoustic signal output from the external object.

10. The head-wearable electronic device of claim 9, wherein the instructions, when executed by the at least one processor individually or collectively, cause the head-wearable electronic device to:

request, to the external object, at least temporary cessation of reproducing of the first channel among the plurality of channels.

11. A method of operating a head-wearable electronic device including at least one speaker, at least one microphone, at least one display, and at least one camera, comprising:

controlling the at least one display to display a screen using images representing a field-of-view (FOV) of the at least one camera;

controlling the at least one display to display, within the screen, a virtual object to be seen as being positioned within the FOV of the at least one camera;

receiving an acoustic signal through the at least one microphone;

based on receiving the acoustic signal with a first volume while the virtual object is displayed, identifying whether the acoustic signal is generated by an external object based on recognizing at least one image received via the at least one camera;

based on identifying that the acoustic signal is generated by the external object, identifying a second volume by adjusting the first volume using position relationship between the external object and the virtual object; and based on identifying an audio signal associated with the virtual object, controlling the at least one speaker to output the audio signal with the second volume.

12. The method of claim 11, wherein the identifying the external object comprises:

identifying, in response to receiving the acoustic signal, a first direction of the acoustic signal regarding the head-wearable electronic device;

identifying a second direction of the external object based on the image; and identifying, based on the first direction and the second direction, whether the acoustic signal is output from the external object.

13. The method of claim 11, wherein the identifying the external object comprises:

identifying, based on a category to which the external object is classified, whether the acoustic signal is output from the external object.

14. The method of claim 13, wherein the identifying the external object comprises:

identifying a first direction of the acoustic signal with respect to the head-wearable electronic device;

identifying a second direction of the external object with respect to the head-wearable electronic device; and determining whether the acoustic signal is output from the external object based on a difference between the first direction and the second direction.

15. The method of claim 11, wherein the identifying the second volume comprises:

obtaining, in a state of identifying a first external object that is the external object, and a second external object different from the first external object using the at least one image received via the at least one camera, a first distance between the first external object and the virtual object, and a second distance between the second external object and the virtual object; and obtaining, based on the first distance less than the second distance, the second volume based on the first volume of the acoustic signal output from the first external object.

16. A non-transitory computer readable storage medium storing instructions, wherein the instructions, when executed by a head-wearable electronic device including at least one speaker, at least one microphone, at least one display, and at least one camera, cause the head-wearable electronic device to:

control the at least one display to display a screen using images representing a field-of-view (FOV) of the at least one camera;

control the at least one display to display, within the screen, a virtual object to be seen as being positioned within the FOV of the at least one camera;

receive an acoustic signal through the at least one microphone;

based on receiving the acoustic signal with a first volume while the virtual object is displayed, identify whether the acoustic signal is generated by an external object based on recognizing at least one image received via the at least one camera;

based on identifying that the acoustic signal is generated by the external object, identify a second volume by adjusting the first volume using position relationship between the external object and the virtual object; and based on identifying an audio signal associated with the virtual object, control the at least one speaker to output the audio signal with the second volume.

17. The non-transitory computer readable storage medium of claim 16, wherein the instructions, when executed by the head-wearable electronic device, cause the head-wearable electronic device to:

identify, in response to receiving the acoustic signal, a first direction of the acoustic signal regarding the head-wearable electronic device;

identify a second direction of the external object based on the image; and identify, based on the first direction and the second direction, whether the acoustic signal is output from the external object.

18. The non-transitory computer readable storage medium of claim 16, wherein the instructions, when executed by the head-wearable electronic device, cause the head-wearable electronic device to:

identify, based on a category to which the external object is classified, whether the acoustic signal is output from the external object.

19. The non-transitory computer readable storage medium of claim 18, wherein the instructions, when executed by the head-wearable electronic device, cause the head-wearable electronic device to:

identify a first direction of the acoustic signal with respect to the head-wearable electronic device;

identify a second direction of the external object with respect to the head-wearable electronic device; and determine whether the acoustic signal is output from the external object based on a difference between the first direction and the second direction.

20. The non-transitory computer readable storage medium of claim 16, wherein the instructions, when executed by the head-wearable electronic device, cause the head-wearable electronic device to:

obtain, in a state of identifying a first external object that is the external object, and a second external object different from the first external object using the at least one image received via the at least one camera, a first distance between the first external object and the virtual object, and a second distance between the second external object and the virtual object; and obtain, based on the first distance being less than the second distance, the second volume based on the first volume of the acoustic signal output from the first external object.

* * * * *